United States Patent
Tsukada

(10) Patent No.: US 12,160,549 B2
(45) Date of Patent: Dec. 3, 2024

(54) IMAGE PROCESSING APPARATUS, IMAGE PROCESSING METHOD, AND STORAGE MEDIUM FOR SETTING A FOLDER BY USING A CHARACTER STRING IN A DOCUMENT

(71) Applicant: CANON KABUSHIKI KAISHA, Tokyo (JP)

(72) Inventor: Yoshihiro Tsukada, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/298,281

(22) Filed: Apr. 10, 2023

(65) Prior Publication Data

US 2023/0247148 A1 Aug. 3, 2023

Related U.S. Application Data

(63) Continuation of application No. 17/409,108, filed on Aug. 23, 2021, now Pat. No. 11,652,932, which is a continuation of application No. 16/679,049, filed on Nov. 8, 2019, now Pat. No. 11,128,767.

(30) Foreign Application Priority Data

Nov. 20, 2018 (JP) .................................. 2018-217584

(51) Int. Cl.
  *H04N 1/00* (2006.01)
  *G06V 10/22* (2022.01)
  *G06V 30/10* (2022.01)
  *G06V 30/148* (2022.01)

(52) U.S. Cl.
  CPC ......... *H04N 1/00331* (2013.01); *G06V 10/22* (2022.01); *G06V 30/153* (2022.01); *H04N 1/00217* (2013.01); *H04N 1/00411* (2013.01); *G06V 30/10* (2022.01); *H04N 1/00408* (2013.01); *H04N 2201/0094* (2013.01); *H04N 2201/3229* (2013.01)

(58) Field of Classification Search
  None
  See application file for complete search history.

(56) References Cited

U.S. PATENT DOCUMENTS

| 9,584,678 | B2* | 2/2017 | Nonaka | H04N 1/32486 |
| 2006/0004867 | A1* | 1/2006 | Tamai | H04N 1/00408 |
| 2007/0019227 | A1* | 1/2007 | Hibino | H04N 1/32058 |
| | | | | 358/1.15 |

(Continued)

FOREIGN PATENT DOCUMENTS

KR 20140030391 A 3/2014

*Primary Examiner* — Miya J Cato

(74) *Attorney, Agent, or Firm* — Canon U.S.A., Inc. IP Division

(57) ABSTRACT

An image processing apparatus includes a character recognition unit configured to perform character recognition processing for recognizing one or more characters included in image data and acquiring character information, a display unit configured to display one or more characters indicated by the character information acquired by the character recognition unit, and a transmission unit configured to transmit the image data to a folder the name of which is a character selected by a user from among the one or more characters displayed by the display unit.

21 Claims, 20 Drawing Sheets

(56) References Cited

U.S. PATENT DOCUMENTS

| | | | |
|---|---|---|---|
| 2016/0072972 A1* | 3/2016 | Akuzawa | H04N 1/00506 |
| | | | 358/1.13 |
| 2019/0065843 A1* | 2/2019 | Matsumoto | G06V 30/416 |
| 2019/0089862 A1* | 3/2019 | Sugawara | H04N 1/00212 |
| 2019/0197305 A1* | 6/2019 | Kanada | G06V 30/40 |
| 2021/0352183 A1* | 11/2021 | Hirota | H04N 1/00949 |
| 2022/0150370 A1* | 5/2022 | Hirota | H04N 1/00511 |

* cited by examiner

FIG.7

DEVICE SERIAL NO.: abcd0101

APPLICATION MANAGEMENT | ONE-TOUCH TRANSMISSION SCAN > DETAILED BUTTON INFORMATION > BUTTON EDITING > KEYWORD STRING SETTING

KEYWORD STRING SETTING ~700

SET KEYWORD STRING AND CLICK [OK].

[OK] 707  [CANCEL] 708

KEYWORD STRING

CHARACTER TYPE: [NUMERIC ONLY ▼ / ALPHANUMERIC] ~701

NUMBER OF CHARACTERS (UP TO 16 CHARACTERS): [7] ~702

DISPLAY AT INPUT (UP TO 64 CHARACTERS): [INPUT PATIENT NUMBER] ~703

CHARACTER RECOGNITION: [DISABLE ▼ / ENABLE] ~704

CHARACTER RECOGNITION AREA: [NOT SPECIFIED] ~705 [SPECIFY AREA] ~706

FIG.9

```
DEVICE SERIAL NO.: abcd0101                                                                    920
APPLICATION MANAGEMENT   ONE-TOUCH TRANSMISSION SCAN > DETAILED BUTTON INFORMATION > BUTTON EDITING
                         BUTTON EDITING  ~900              919~ [OK] [CANCEL]
                         [DETAILED BUTTON INFORMATION]
                           BASIC SETTING
                             BUTTON NAME:    [APPLICATION A] ~901  (UP TO 20 CHARACTERS)
                             ☐ DISPLAY CONFIRMATION SCREEN BEFORE EXECUTION
                                                                                 904
                             FILE NAME:      [BUTTON NAME ▼] ~902
                             KEYWORD:   903~ ☑ ENABLE [SPECIFIED CHARACTER STRING...(FIXED CHARACTER STRING)]
                             ICON:           ☐ 🗒  ☑ 📄  ☐ 📚  ☐ 🔺
                             ORGANIZATION:   [ORGANIZE (FILE AND FOLDER) ▼] ~905
                             TRANSMISSION TYPE: [E-MAIL ▼]  [CHANGE] ~907
908 ~                        TRANSMISSION SETTING (E-MAIL)  ~906
                             TRANSMISSION DESTINATION: [                    ] ~909
                                            910~ [ADD]
                             TRANSMISSION DESTINATION LIST: To:mail_a@sample.com
                                                            Cc:mail_b@sample.com        ~911
                                                            Bcc:mail_c@sample.com
                                            912~ [SELECT FROM ADDRESS BOOK...] [SWITCHING OF To/Cc/Bcc] [DELETE]
                                                                                        913       914
                             READING SIZE:   [A4 ▼]
                             COLOR MODE:     [COLOR ▼]
                             FILE FORMAT:    [PDF ▼]
                               ENCRYPTED PDF: [EQUIVALENT TO ACROBAT10.0/256-bit AES ▼]
                               ☐ SET/CHANGE PASSWORD
                                 PASSWORD:                [                    ]
                                 INPUT PASSWORD FOR CONFIRMATION: [              ]
SETTING MENU                 ELECTRONIC SIGNATURE: [NONE ▼]
CHANGES FOR EACH             ☐ SPLIT FOR EACH PAGE
TRANSMISSION TYPE            DENSITY:              [0 ▼]
                             DOCUMENT ORIENTATION: [LONGITUDINALLY LONG DOCUMENT ▼]
                             DOCUMENT TYPE:        [TEXT/PHOTOGRAPH ▼]
                             DOUBLE-SIDED DOCUMENT: [OFF ▼]
                             SHARPNESS:            [0 ▼]         915                 916
                             DATA SIZE:            [STANDARD ▼]
                             SUBJECT:              [APPLICATION A ▼] (UP TO 20 CHARACTERS) [ADD BUTTON NAME]
                             BODY TEXT:  917~ [DOCUMENT SCANNED WITH APPLICATION A] (UP TO 20 CHARACTERS) [ADD BUTTON NAME]
                             TRANSMISSION         ⦿ NONE                              918
                             DESTINATION:         ○ SPECIFICATION FROM ADDRESS BOOK
                                                  [SELECT FROM ADDRESS BOOK...]
                             IMPORTANCE:          [NORMAL ▼]
```

FIG.10

DEVICE SERIAL NO.: abcd0101
APPLICATION MANAGEMENT | ONE-TOUCH TRANSMISSION SCAN > DETAILED BUTTON INFORMATION > BUTTON EDITING

BUTTON EDITING ~1000

[OK] [CANCEL]

DETAILED BUTTON INFORMATION

BASIC SETTING
BUTTON NAME: [APPLICATION B] ~1001
☐ DISPLAY CONFIRMATION SCREEN BEFORE EXECUTION

FILE NAME: [BUTTON NAME ▼] ~1002

KEYWORD: 1003~ ☑ ENABLE [SPECIFIED CHARACTER STRING ... (FIXED CHARACTER STRING)] ~1004

ICON: ☐ 📄 ☐ 📝 ☑ 📃 ☐ 📚 ☐ ⚠️

ORGANIZATION: [ORGANIZE (FILE AND FOLDER) ▼] ~1005

TRANSMISSION TYPE: [USB MEMORY ▼] [CHANGE] ~1007

1008~ TRANSMISSION SETTING (USB MEMORY) — 1006

READING SIZE: [A4 ▼]
COLOR MODE: [COLOR ▼]
FILE FORMAT: [PDF ▼]
  ENCRYPTED PDF: [EQUIVALENT TO ACROBAT10.0/256-bit AES ▼]
  ☐ SET/CHANGE PASSWORD
  PASSWORD: [ ]
  INPUT PASSWORD FOR CONFIRMATION: [ ]
  ELECTRONIC SIGNATURE: [NONE ▼]
  ☐ SPLIT FOR EACH PAGE
DENSITY: [0 ▼]
DOCUMENT ORIENTATION: [LONGITUDINALLY LONG DOCUMENT ▼]
DOCUMENT TYPE: [TEXT/PHOTOGRAPH ▼]
DOUBLE-SIDED DOCUMENT: [SPREAD DOCUMENT ▼]
SHARPNESS: [0 ▼]
DATA SIZE: [LARGE: IMAGE QUALITY PRIORITIZED ▼]

SETTING MENU CHANGES FOR EACH TRANSMISSION TYPE

FIG. 12A 1200

ADDRESS BOOK
BEST MEMBERS
ABBREVIATED DIALING — 1201

ADDRESS BOOK > BEST MEMBERS > NEW DESTINATION REGISTRATION
NEW DESTINATION REGISTRATION
SELECT DESTINATION TYPE TO BE REGISTERED AND CLICK [OK].   1203  1204
                                                          [OK] [CANCEL]
DESTINATION TYPE TO BE REGISTERED
TYPE:   ☐ ☒ E-MAIL  — 1202
        ☐ ☐ FILE

FIG. 12B 1210

ADDRESS BOOK
BEST MEMBERS
ABBREVIATED DIALING

ADDRESS BOOK > BEST MEMBERS > NEW DESTINATION REGISTRATION > NEW DESTINATION REGISTRATION: FILE
NEW DESTINATION REGISTRATION: FILE
                                                          1217  1218
                                                          [OK] [CANCEL]
FILE
NUMBER:         5
NAME:           LETTER OF INTRODUCTION 2    — 1211
PROTOCOL:       Windows (SMB) ▼              — 1212
HOST NAME:      FILE SERVER                  — 1213
PATH TO FOLDER: LETTER OF INTRODUCTION 2    — 1214
USER NAME:      iryou01                      — 1215
☒ SET PASSWORD
PASSWORD:       iryou01                      — 1216

FIG.17

| | | |
|---|---|---|
| MEDICAL QUESTIONNAIRE | | |
| \\FILE_SERVER\MEDICAL_QUESTIONNAIRE | 123 | |

- PATIENT ID: 123     SEP. 5, 2018
- OTOLARYNGOLOGY
- DATE OF BIRTH
  MAR. 1, 1990

| DATE OF CONSULTATION |
| SEP. 5, 2018 |
| PATIENT ID |
| 123 |
| OTOLARYNGOLOGY |
| DATE OF BIRTH |
| MAR. 1, 1990 |

CLEAR
PREVIOUS
NEXT
APPLY

IMAGE PROCESSING APPARATUS, IMAGE PROCESSING METHOD, AND STORAGE MEDIUM FOR SETTING A FOLDER BY USING A CHARACTER STRING IN A DOCUMENT

CROSS REFERENCE OF RELATED APPLICATIONS

This application is a continuation of U.S. patent application Ser. No. 17/409,108, filed on Aug. 23, 2021, which is a continuation of U.S. patent application Ser. No. 16/679,049, filed Nov. 8, 2019, now U.S. Pat. No. 11,128,767, issued on Sep. 21, 2021, which claims the benefit of Japanese Patent Application No. 2018-217584, filed Nov. 20, 2018, all of which are hereby incorporated by reference herein in its entirety.

BACKGROUND OF THE INVENTION

Field of the Invention

The present disclosure relates to an image processing apparatus, a method for controlling the image processing apparatus, and a storage medium.

Description of the Related Art

Japanese Patent Application Laid-Open No. 2005-234708 discusses an image processing apparatus that scans an image of a document to generate image data, performs character recognition processing on an area specified by a user in advance, and transmits the image data to a folder under a folder name having a character string obtained through the character recognition processing.

SUMMARY OF THE INVENTION

Inputting characters of a folder path one by one by using a keyboard takes much time.

With the use of the technique discussed in Japanese Patent Application Laid-Open No. 2005-234708, specifying an area eliminates the need of inputting characters of a folder path one by one. In a document in which a character string the user wants to use as the name of a destination folder is not described in the specified area, a target character string however cannot be set in the folder path.

In particular, the position of the target character string often differs from document to document to be scanned, and thus it is necessary and troublesome to set an area for each document.

In view of the above-described issues, the present disclosure is directed to reducing user's work in setting a folder path by using a character string in a document.

According to an aspect of the present disclosure, an image processing apparatus includes a character recognition unit configured to perform character recognition processing for recognizing one or more characters included in image data and acquiring character information, a display unit configured to display one or more characters indicated by the character information acquired by the character recognition unit, and a transmission unit configured to transmit the image data to a folder the name of which is a character selected by a user from among the one or more characters displayed by the display unit.

Further features of the present disclosure will become apparent from the following description of exemplary embodiments with reference to the attached drawings.

BRIEF DESCRIPTION OF THE DRAWINGS

FIG. 7 illustrates an example of a keyword character string setting screen.

FIG. 9 illustrates an example of a button setting editing screen when a transmission type is "E-mail".

FIG. 10 illustrates an example of a button setting editing screen when the transmission type is "Universal Serial Bus (USB) Memory".

FIGS. 12A and 12B illustrate examples of screens for registering an address in an address book.

FIG. 17 illustrates an example of a selection screen.

DESCRIPTION OF THE EMBODIMENTS

Exemplary embodiments of the present disclosure will be described below with reference to the accompanying drawings. Configurations described in the following exemplary embodiments are to be considered as illustrative, and the present disclosure is not limited to illustrated configurations.

Figure 1:
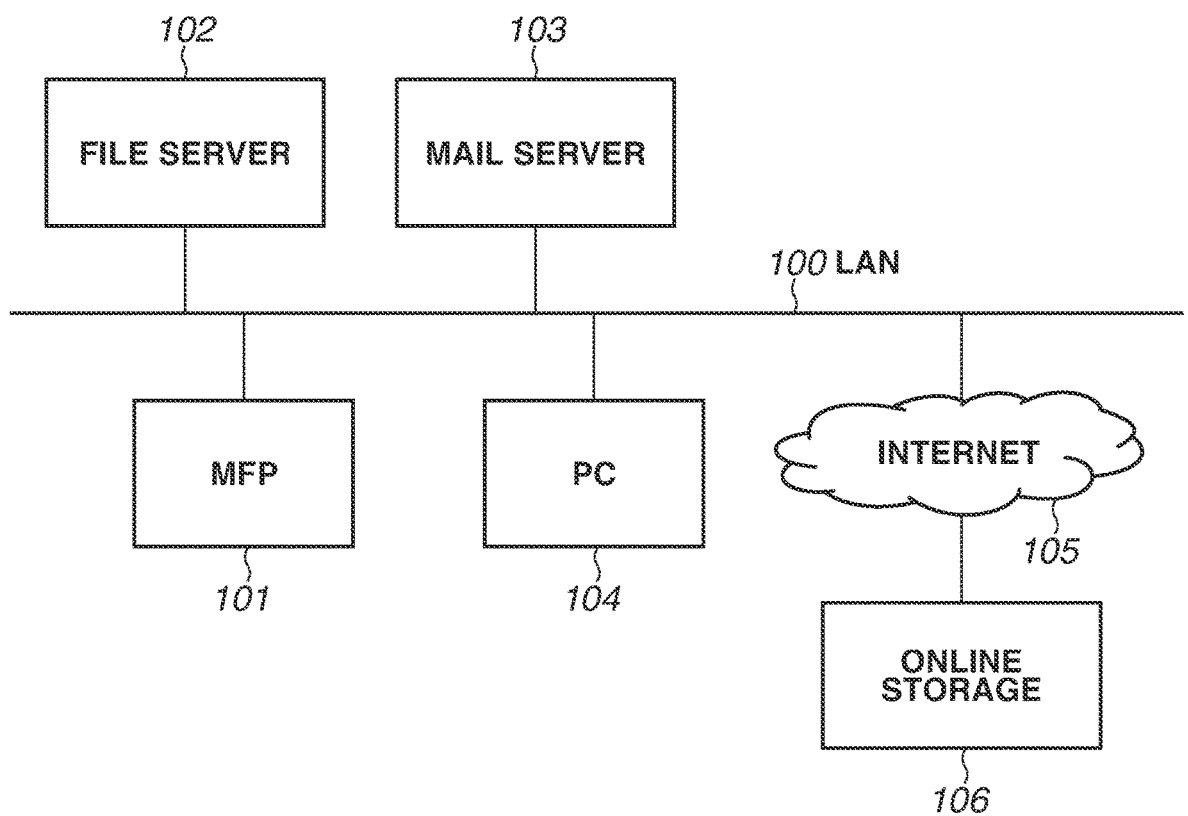
FIG. 1 illustrates an example of a configuration of a reading system.

A first exemplary embodiment of the present disclosure will be described below. FIG. 1 illustrates a configuration example of a reading system according to the present disclosure. The reading system according to the present exemplary embodiment includes a multifunction peripheral (MFP) 101 as an example of an image processing apparatus, a file server 102 as an information processing apparatus, a mail server 103, and an online storage 106. The MFP 101, the file server 102, the mail server 103, and the online storage 106 are connected to a Local Area Network (LAN)

100. On the LAN 100, the MFP 101, the file server 102, the mail server 103, and the personal computer (PC) 104 are connected through a network so that they can communicate with each other. The MFP 101 and the online storage 106 can communicate with each other via the LAN 100 and the Internet 105.

The MFP 101 scans an image of a document, generates the read image, and transmits the generated image data to the file server 102, the mail server 103, and the online storage 106. Image data according to the present exemplary embodiment is not limited to electronic data obtained by an image being converted into RAW image format data, and may be electronic data in such image formats as Tag Image File Format (TIFF) and Joint Photographic Experts Group (JPEG), and electronic data in Portable Document Format (PDF). The file server 102 is a file server conforming to File Transfer Protocol (FTP) and the Server Message Block (SMB) protocols. The mail server 103 is a mail server conforming to Simple Mail Transfer Protocol (SMTP). The online storage 106 is an online storage conforming to Web-based Distributed Authoring and Versioning (Web-DAV) (a file sharing protocol using Hyper Text Transfer Protocol (HTTP)). The PC 104 accesses the web server included in the MFP 101 by using HTTP and is capable of referencing and updating setting values. The LAN 100 may include a wired LAN using Ethernet or a wireless LAN.

Figure 2:
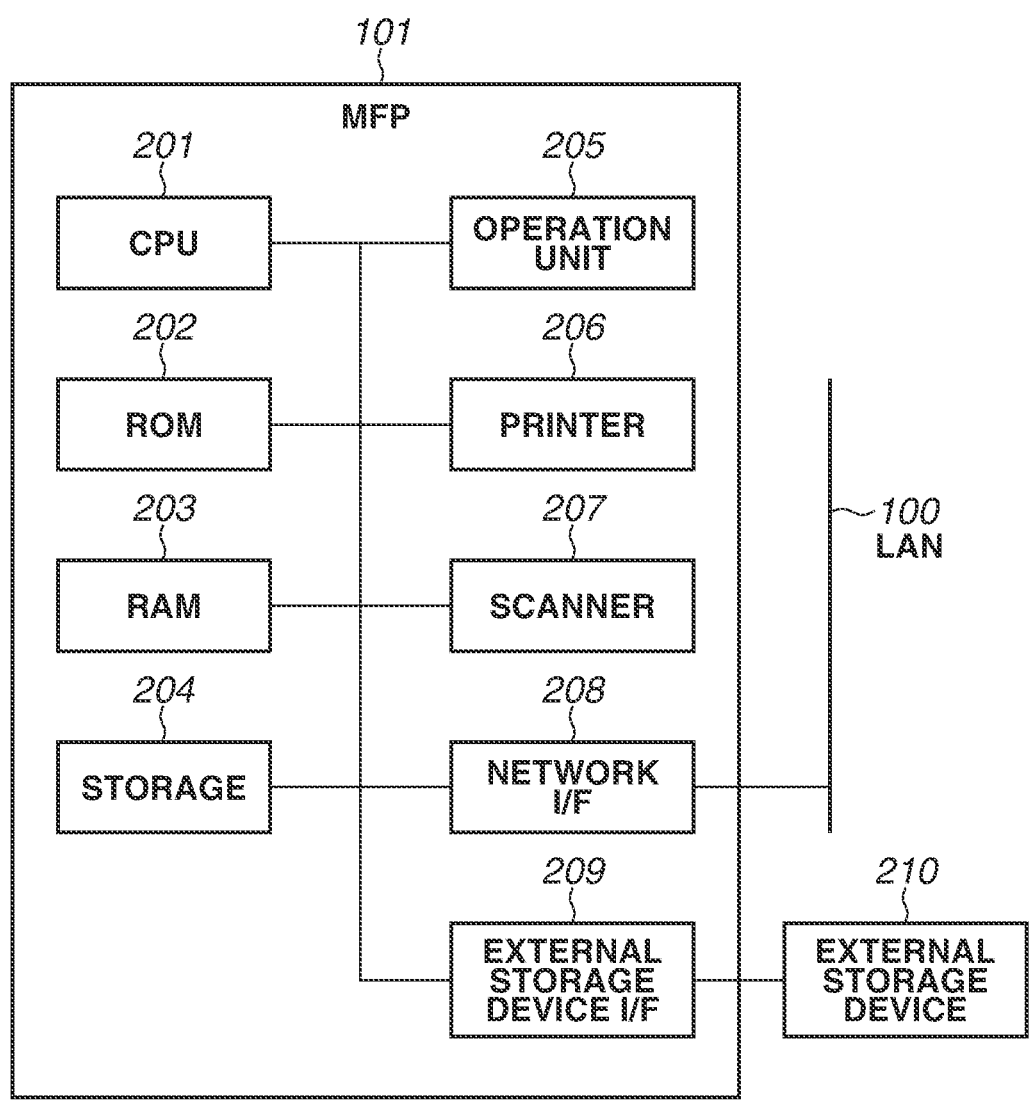
FIG. 2 illustrates an example of a hardware configuration of a multifunction peripheral (MFP).

FIG. 2 illustrates an example of a hardware configuration of the MFP 101. The MFP 101 includes a CPU 201, a ROM 202, a RAM 203, a storage 204, an operation unit 205, a printer 206, a scanner 207, a network interface (I/F) 208, and an external storage device I/F 209.

The CPU 201 controls various hardware components 202 to 208 included in the MFP 101 to implement each function of the MFP 101. The CPU 201 transmits signals to various hardware components via bus lines to implement data communication with other hardware components.

The CPU 201 of the MFP 101 controls the operation of the MFP 101 in accordance with a control program stored in the ROM 202. More specifically, the CPU 201 executes an operating system (OS) for controlling the MFP 101 and driver programs for controlling the hardware components. Function operations and control desired by the user are implemented by application programs arranged on the OS mutually operating. The OS and various programs stored in the ROM 202 are read in the RAM 203 and then executed.

The ROM 202 is a memory for storing programs and various data to be used by the CPU 201. The RAM 203 is a work memory for temporarily storing a program and data to be used for computations by the CPU 201. The storage 204 is a storage device for storing various data and various programs.

Although a flash memory is assumed as the storage 204 according to the present exemplary embodiment, a solid state drive (SSD), a hard disk drive (HDD), an embedded multimedia card (eMMC), and other auxiliary storage devices are also applicable. Although, in the MFP 101, a single CPU 201 executes processing illustrated in flowcharts (described below) by using a single memory (RAM 203), the MFP 101 may use other configurations. For example, processing illustrated in flowcharts (described below) may be performed by a plurality of CPUs, a plurality of RAMs, a plurality of ROMs, and a plurality of storages being operated in a collaborative way. Part of processing may be executed by using hardware circuitry, such as an Application Specific Integrated Circuit (ASIC) and a Field Programmable Gate Array (FPGA).

The operation unit 205, which is a user interface, such as a touch panel, for the user to operate the MFP 101, receives operations and inputs by the user. The operation unit 205 can also be used as a display unit for displaying screens for operating the MFP 101.

The printer 206 is a unit for implementing a print function. The CPU 201 controls the printer 206 to execute a print job received from the PC 104, thus printing an image on paper. A print job herein is data including instructions to cause the MFP 101 to perform print processing, image data, and print setting information.

The scanner 207 is a unit for implementing a scanning function. The CPU 201 controls the scanner 207 to perform processing for optically scanning an image of a document and generating image data.

The network I/F 208 performs wired LAN communication, such as the communication over Ethernet. The network I/F 208 may be a network I/F for performing wireless LAN communication or a Universal Serial Bus (USB)-LAN I/F.

The external storage device I/F 209 is an interface for the MFP 101 to communicate with an external storage device 210. The CPU 201 controls the external storage device I/F 209 to store image data in the external storage device 210. Although, in the present exemplary embodiment, a USB interface is assumed as the external storage device I/F 209 and a USB memory is assumed as the external storage device 210, the external storage device I/F 209 may be a Secure Digital (SD) card slot for communicating with an external storage device, such as an SD card.

Figure 3:
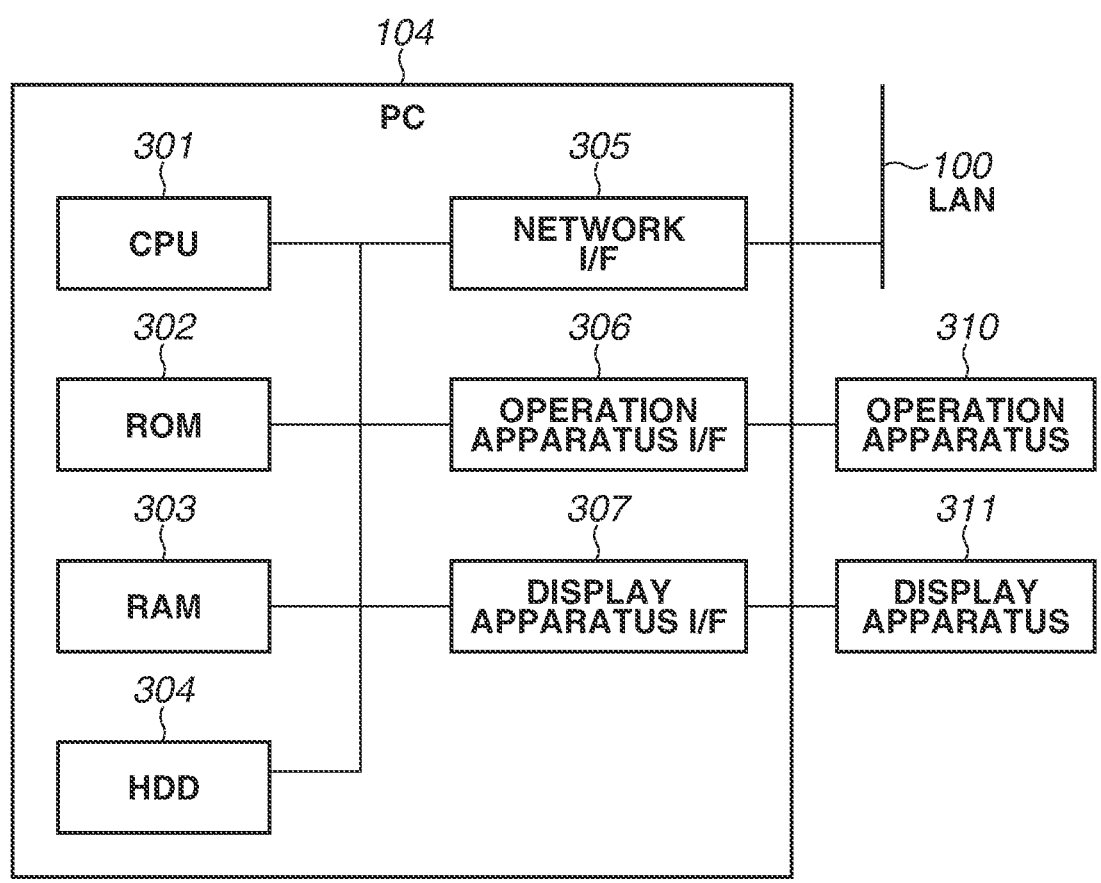
FIG. 3 illustrates an example of a hardware configuration of a personal computer (PC).

FIG. 3 illustrates an example of a hardware configuration of the PC 104. The PC 104 includes a CPU 301, a ROM 302, a RAM 303, an HDD 304, a network I/F 305, an operation apparatus I/F 306, and a display apparatus I/F 307.

The CPU 301 controls various hardware components 302 to 307 included in the PC 104 to implement each function of the PC 104. The CPU 301 transmits signals to various hardware components via bus lines to implement data communication with other hardware components.

The CPU 301 of the PC 104 controls the operation of the PC 104 in accordance with a control program stored in the ROM 302. More specifically, the CPU 301 executes the OS for controlling the PC 104. The function operations and control desired by the user are implemented by the application programs arranged on the OS mutually operating. The OS and various programs, which are stored in the ROM 302, are read in the RAM 303 and then executed.

The ROM 302 is a memory for storing programs and various data to be used by the CPU 201. The RAM 303 is a work memory for temporarily storing a program and data to be used for computations by the CPU 201. The HDD 304 is a storage device for storing various data and various programs.

The network I/F 305 performs wired LAN communication, such as one over Ethernet. The network I/F 305 may be a network I/F for performing wireless LAN communication or a USB-LAN I/F.

The operation apparatus I/F 306 is an interface for connecting the PC 104 to an operation apparatus 310, such as a keyboard and a mouse.

The display apparatus I/F 307 is an interface for connecting the PC 104 to a display apparatus 311, such as a liquid crystal display monitor.

Although the PC 104 according to the present exemplary embodiment is connected to an external operation apparatus and an external display apparatus, for example, an operation unit and a display unit may be built in the PC 104.

Figure 4:
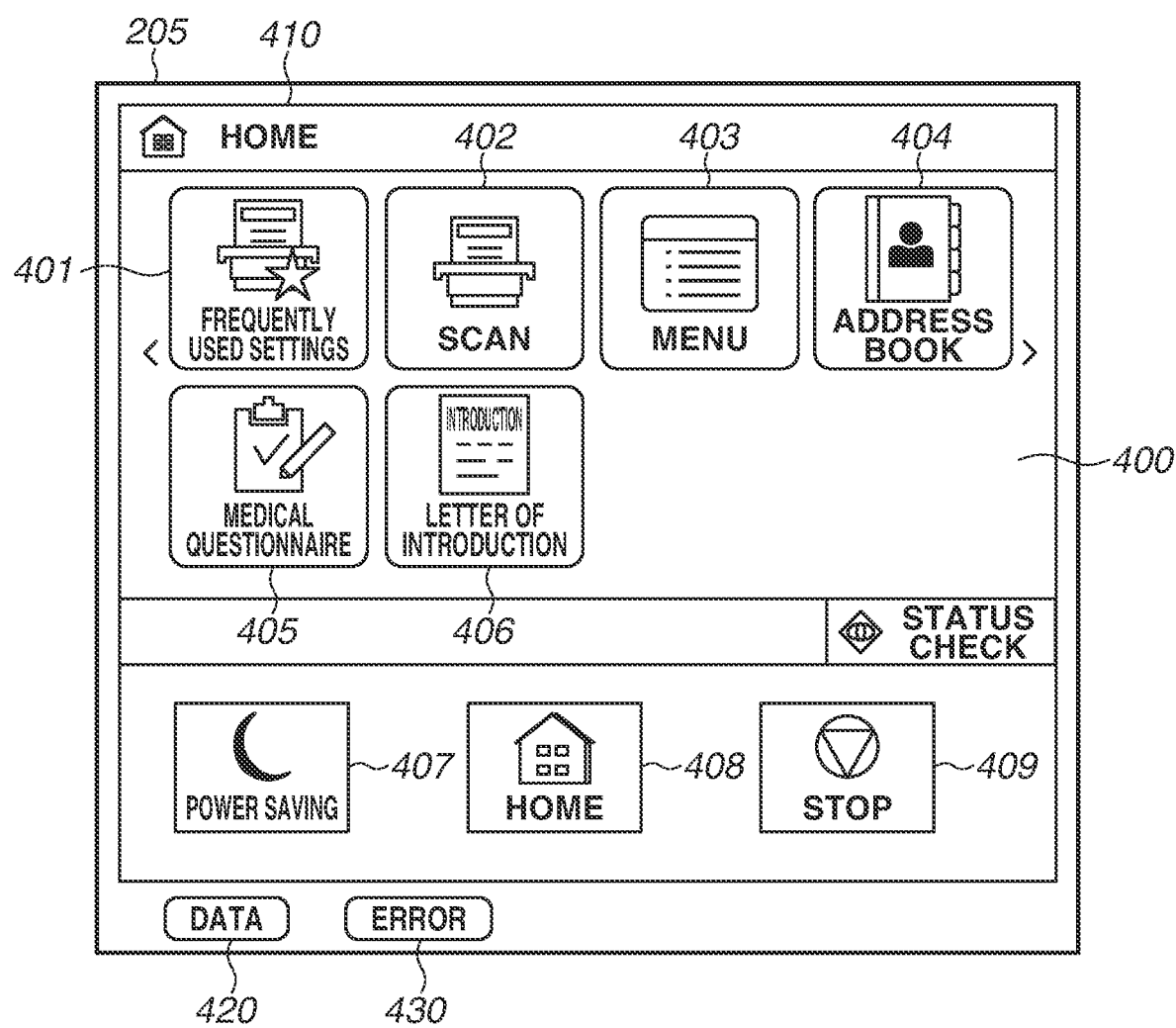
FIG. 4 illustrates an example of a screen which is displayed on an operation unit.

FIG. 4 illustrates an example of a screen which is displayed on the operation unit 205. The operation unit 205 includes a touch panel 410, a Data LED 420, and an Error LED 430. The touch panel 410 displays a Home screen 400 which is displayed immediately after the MFP 101 is activated. The Home screen 400 is a screen for the user to instruct the MFP 101 to execute functions of the MFP 101. The Home screen 400 displays a Frequently Used Settings button 401, a Scan button 402, a Menu button 403, an Address Book button 404, a Medical Questionnaire button 405, and a Letter Of Introduction button 406. The Home screen 400 constantly displays a Power-saving button 407, a Home button 408, and a Stop button 409. The Power-saving button 407, the Home button 408, and the Stop button 409 may be provided as hardware keys on the operation unit 205.

The Frequently Used Settings button 401 is used for displaying, when selected by the user, a screen for performing a specific function in a state where user settings have been input.

The Scan button 402 is used for displaying, when selected by the user, a screen for performing scan processing to generate image data, transmitting the generated image data through e-mail or file transmission, and storing the image data in the external storage device 210. The e-mail transmission refers to transmitting image data generated by scanning a document, as attachment data with an e-mail. The file transmission refers to transmitting image data to the file server 102 or the PC 104 by using a communication protocol, such as SMB and FTP.

The Menu button 403 is used for displaying, when selected by the user, a menu screen.

The Address Book button 404 is used for displaying, when selected by the user, a screen displaying registered addresses (destination information). The screen displaying addresses exhibits the transmission type, such as, e-mail transmission, SMB transmission, FTP transmission, and WebDAV transmission, and destination information, such as mail address, host name, and server information.

The Medical Questionnaire button 405 and the Letter Of Introduction button 406 are one-touch transmission buttons. A one-touch transmission button is used for displaying, when selected by the user, a screen for scanning an image of a document based on scanning settings preset by the user to generate image data, and transmitting the image data based on the transmission type preset by the user.

The Power-saving button 407 is used for shifting, when selected by the user, the MFP 101 to the power-saving state.

The Home button 408 is used for displaying, when selected by the user, the Home screen 400 on the operation unit 205.

The Stop button 409 is used for canceling, when selected by the user, the execution of a job, such as a print job currently being executed by the MFP 101. This Stop button 409 may cancel the execution of a copy job or a transmission job when selected by the user.

The Data LED 420 and the Error LED 430 notify the user of the status of the MFP 101. The Data LED 420 illuminates during execution of e-mail or file transmission. The Error LED 430 illuminates if an error occurs in the MFP 101.

The Home screen 400 is a function selection screen for a user to select a function to use from among a plurality of functions including a copy function of performing printing based on image data, and a transmission function of scanning a document to generate image data and transmitting the image data to an external apparatus.

Assume a document in which a character string the user wants to use as the name of a destination folder is not described in a fixed area. In scanning an image of the document to generate image data and in transmitting the generated image data, the following issues arise in the image processing apparatus in Japanese Patent Application Laid-Open No. 2005-234708.

Inputting characters of a folder path one by one by using a keyboard may be time consuming.

With the use of a technique discussed in Japanese Patent Application Laid-Open No. 2005-234708, specifying an area eliminates the need of inputting characters of a folder path one by one. However, in a document in which a character string the user wants to use as the name of a destination folder is not described in the specified area, a target character string cannot be set in the folder path.

In particular, the position of the target character string often differs from document to document to be scanned, and thus it is necessary to set an area for each document, which would be troublesome.

To address these issues, performing the following processing enables reducing the user's work when setting a folder path by using a character string in a document.

Figure 5:
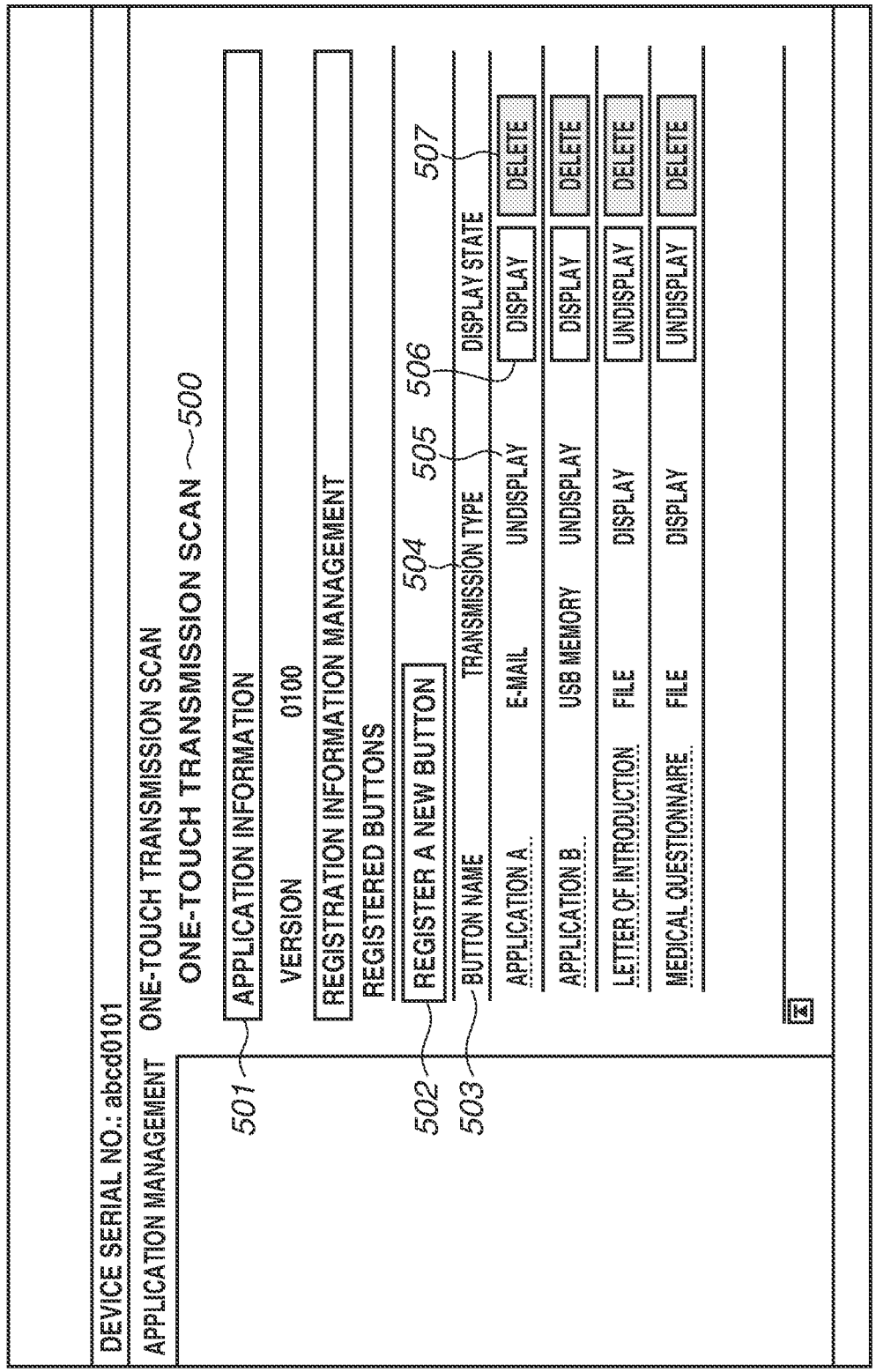
FIG. 5 illustrates an example of a one-touch transmission scan setting screen which is displayed on a display apparatus.

FIG. 5 illustrates an example of a one-touch transmission scan setting screen which is displayed on the display apparatus 311.

A one-touch transmission scan setting screen 500 illustrated in FIG. 5 is displayed, for example, on the display apparatus 311 connected to the PC 104 which is accessing the web server of the MFP 101 through HTTP communication.

The one-touch transmission scan setting screen 500 displays Application Information area 501, a "Register New Button" button 502, items 503 to 505, Display/Undisplay buttons 506, and Delete buttons 507.

The Application Information area 501 displays the version number of the application. Referring to FIG. 5, the version number 1.00 is displayed.

Figure 6:
FIG. 6 illustrates an example of a setting editing screen for a button for performing one-touch transmission scan.

The "Register New Button" button 502 is used for, when selected by the user, registering a new button which is to be displayed on a screen displayed on the operation unit 205 and is used for executing a one-touch transmission scan. When the "Register New Button" button 502 is selected, a setting editing screen 600 illustrated in FIG. 6 is displayed on the display apparatus 311. The setting editing screen 600 illustrated in FIG. 6 will be described in detail below.

The item 503 indicates the names of buttons for performing one-touch transmission scan registered in the MFP 101.

The item 504 indicates the transmission type set to each button for performing one-touch transmission scan registered in the MFP 101.

The item 505 indicates the display forms of buttons for performing one-touch transmission scan registered in the MFP 101. The one-touch transmission scan setting screen 500 also displays the Display/Undisplay buttons 506 for changing the display form of the buttons, and the Delete buttons 507. For example, when the display form of the "Letter Of Introduction" button is "Display", the button is displayed on the Home screen 400 on the touch panel 410, as in "the Letter Of Introduction" button 406 illustrated in FIG. 4. The Display/Undisplay buttons 506 enables the user to select either "Display" or "Undisplay" in a toggle manner.

The Delete button 507 deletes information about the button registered in the MFP 101 when selected by the user.

The button named "Application A" is an example of a button for performing one-touch transmission scan registered in the MFP 101. For this button, the transmission type is "E-mail", and the display form is "Undisplay". The setting editing screen 600 illustrated in FIG. 6 is displayed on the display apparatus 311 not only when the "Register New Button" button 502 is selected but also when the name of an "Application A" button is selected.

Four buttons with the names "Application A", "Application B", "Letter Of Introduction", and "Medical Questionnaire" are registered in FIG. 5. The "Letter Of Introduction" and "Medical Questionnaire" buttons have a display form of "Display", and thus are displayed on the Home screen 400. The "Application A" and "Application B" buttons have a display form of "Undisplay", and thus are not displayed on the Home screen 400.

FIG. 6 illustrates an example of a button setting editing screen for editing a button to be used for performing a one-touch transmission scan. The button setting editing screen 600 illustrated in FIG. 6 is displayed, for example, on the display apparatus 311 connected to the PC 104 which is accessing the web server of the MFP 101 through HTTP communication.

The button setting editing screen 600 is displayed when the user selects the "Register New Button" button 502 or the name of a button illustrated in FIG. 5. When the user selects the name of a button, the button setting editing screen 600 is displayed in a state where the last setting values are input for each item. When the user selects the "Register New Button" button 502, the button setting editing screen 600 is displayed in a state where the setting values are not input for any item. Default values may be pre-input for each item in the button setting editing screen 600.

An input field 601 is used to set the name of a one-touch transmission button. A character string "Letter Of Introduction" is input to the input field 601. A one-touch transmission button performs one-touch transmission scan when selected by the user.

A pull-down menu 602 is an object for setting a file name. The pull-down menu 602 includes options "Button Name" and "Automatic". When "Button Name" is selected, the button name input to the input field 601 becomes the name of a file to be transmitted. When "Automatic" is selected, an automatically determined character string becomes the name of a file. For example, the date and time when scan is performed by the user selecting a one-touch transmission button to be registered in the screen illustrated in FIG. 6 is used as the name of the file.

When a check box 603 is checked, a keyword at the time of file output is enabled. A keyword will be described in detail below with reference to FIG. 7.

A keyword character string setting button 604 is used for displaying a keyword character string setting screen 700 illustrated in FIG. 7 when selected by the user.

A pull-down menu 605 is an object for setting how and whether the transmitted file is to be organized. The user can select one from among "Do Not Organize", "Organize (File)", "Organize (Folder)", and "Organize (File and Folder)" in the pull-down menu 605. When "Do Not Organize" is selected, a keyword is not used. When "Organize (File)" is selected, a keyword is to be included in an output file name. When "Organize (Folder)" is selected, a keyword is to be included in the folder name of a folder to which a file is to be stored. When "Organize (File and Folder)" is selected, a keyword is included in the file name and the folder name to which the file is to be output. Processing which is performed when respective setting is made from the pull-down menu 605 will be described in detail below with reference to FIGS. 16 and 17.

A pull-down menu 606 is an object for selecting the transmission type in transmitting image data generated by a document being scanned. The user can select one from among "File", "E-mail", and "USB Memory" in the pull-down menu 606. When "File" is selected and then a Change button 607 is selected, the image data is transmitted to a folder of the PC 104 or the file server 102 by using such a protocol as SMB, FTP, WebDAV, and Secure Shell File Transfer Protocol (SFTP). When "E-mail" is selected, the image data is transmitted to a destination by using SMTP. When "USB Memory" is selected, the image data is stored in the USB memory as the external storage device 210 connected to the MFP 101.

The Change button 607 is used for changing the transmission type setting to the transmission type displayed in the pull-down menu 606. When the Change button 607 is selected with the transmission type having been selected from the pull-down menu 606, information corresponding to the selected transmission type is displayed in an item 608 and an area 609.

For the item 608, various settings including scan settings at the time of document scanning with a one-touch transmission scan, and transmission settings at the time of transmission can be input. For example, the item 608 includes the destination as displayed in the area 609, reading size, file format, and document orientation settings.

The area 609 is used for displaying a transmission destination of the image data generated by a document being scanned. The destination which is set here is a folder path to be combined with the character string of a text object (described below). The area 609 is a text area where a text cannot be input or edited, and displays the address selected in the address selection screen.

A "Selection from Address Book" button 610 is used for displaying, when selected by the user, an address selection screen 800 in which addresses in the address book stored in the MFP 101 can be selected.

A pull-down menu 611 is used to set a file format to be used in generating a file of image data generated by an image of a document being scanned. A file is generated in the format selected by using the pull-down menu 611.

An OK button 612 is used for storing the setting for the one-touch transmission button in the storage 204 with the settings made in the button setting editing screen 600. When the OK button 612 is selected, the settings are stored in the storage 204. A Cancel button 613 is used for canceling the settings. When the OK button 612 or the Cancel button 613 is pressed, the one-touch transmission scan setting screen 500 illustrated in FIG. 5 is displayed.

FIG. 7 illustrates an example of a keyword character string setting screen. A keyword character string setting screen 700 is displayed when the keyword character string setting button 604 is selected in the button setting editing screen 600 illustrated in FIG. 6. The keyword character string setting screen 700 illustrated in FIG. 7 is displayed, for example, on the display apparatus 311 connected to the PC 104 which is accessing the web server of the MFP 101 through HTTP communication.

A pull-down menu 701 is an object for selecting the type of a keyword character string. For the type of a keyword character string, either "Numeric Only" or "Alphanumeric" can be selected.

An input field 702 is used for setting the number of characters of the keyword character string. According to the present exemplary embodiment, a maximum number of settable characters is 16. By setting the number of characters of the keyword character string here, if the character string recognized in a set character recognition area differs from the character string desired by the user, the different character string can be prevented from being displayed as a recognition result. The keyword character string setting is reflected in a case where a Specify Area button 706 is selected and an area is specified in a character recognition area setting screen 1100 illustrated in FIG. 11.

An input field 703 is used for inputting a character string to be displayed when a keyword character string is input. A maximum number of settable characters is 64.

A pull-down menu 704 is an object for selecting whether Optical Character Recognition (OCR) processing as the character recognition processing is to be performed.

An area 705 displays information indicating whether the character recognition area is specified. The initial value of this area is "Not Specified". When the Specify Area button 706 is selected and a rectangular area is specified in the character recognition area setting screen 1100 illustrated in FIG. 11, "Specified" is displayed. When a Clear button 1102 is selected to delete the rectangular area and then the Apply button 1103 is selected in the character recognition area setting screen 1100, "Not Specified" is displayed in the area 705.

Figure 11:
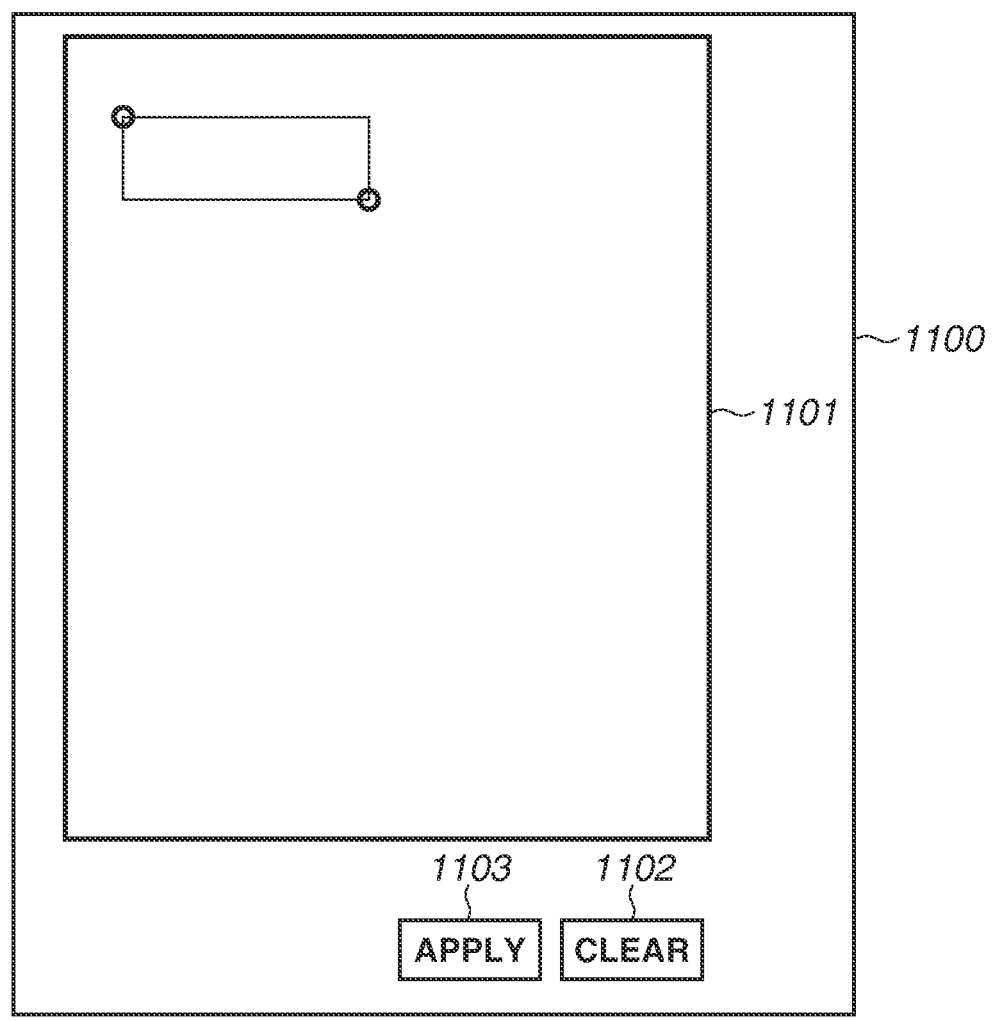
FIG. 11 illustrates an example of a character recognition area setting screen.

FIG. 11 illustrates an example of the character recognition area setting screen which is displayed when the Specify Area button 706 illustrated in FIG. 7 is selected. The character recognition area setting screen 1100 may be displayed and settable for each of the document sizes A4 and A3. The character recognition area setting screen 1100 illustrated in FIG. 11 is displayed, for example, on the display apparatus 311 connected to the PC 104 which is accessing the web server of the MFP 101 through HTTP communication. The character recognition area setting screen 1100 displays an area specification canvas 1101 with an aspect ratio corresponding to the read paper size set with the item 608. The user can specify the starting point and the ending point of a rectangular area by using a pointer. In this case, the starting and ending point coordinates are converted into real space distances, which are temporarily stored. As specific examples of setting values, a starting point (X, Y)=(10, 10) and an ending point (X, Y)=(50, 20) can be set in mm. When the Clear button 1102 is selected, the setting value of the character recognition area can be returned to the initial value. When the Apply button 1103 is selected, the temporarily stored coordinate information for the two points is set to the character recognition area 705. More specifically, the coordinate information is stored in the storage 204 as the character recognition area 705. After the Clear button 1102 and the Apply button 1103 are selected, the display returns to the keyword character string setting screen 700 illustrated in FIG. 7.

An OK button 707 is used for storing the setting values made in the keyword character string setting screen 700 in the storage 204. A Cancel button 708 is used for canceling the setting values. When the OK button 707 or the Cancel button 708 is pressed, the button setting editing screen 600 illustrated in FIG. 6 is displayed.

Figure 8:
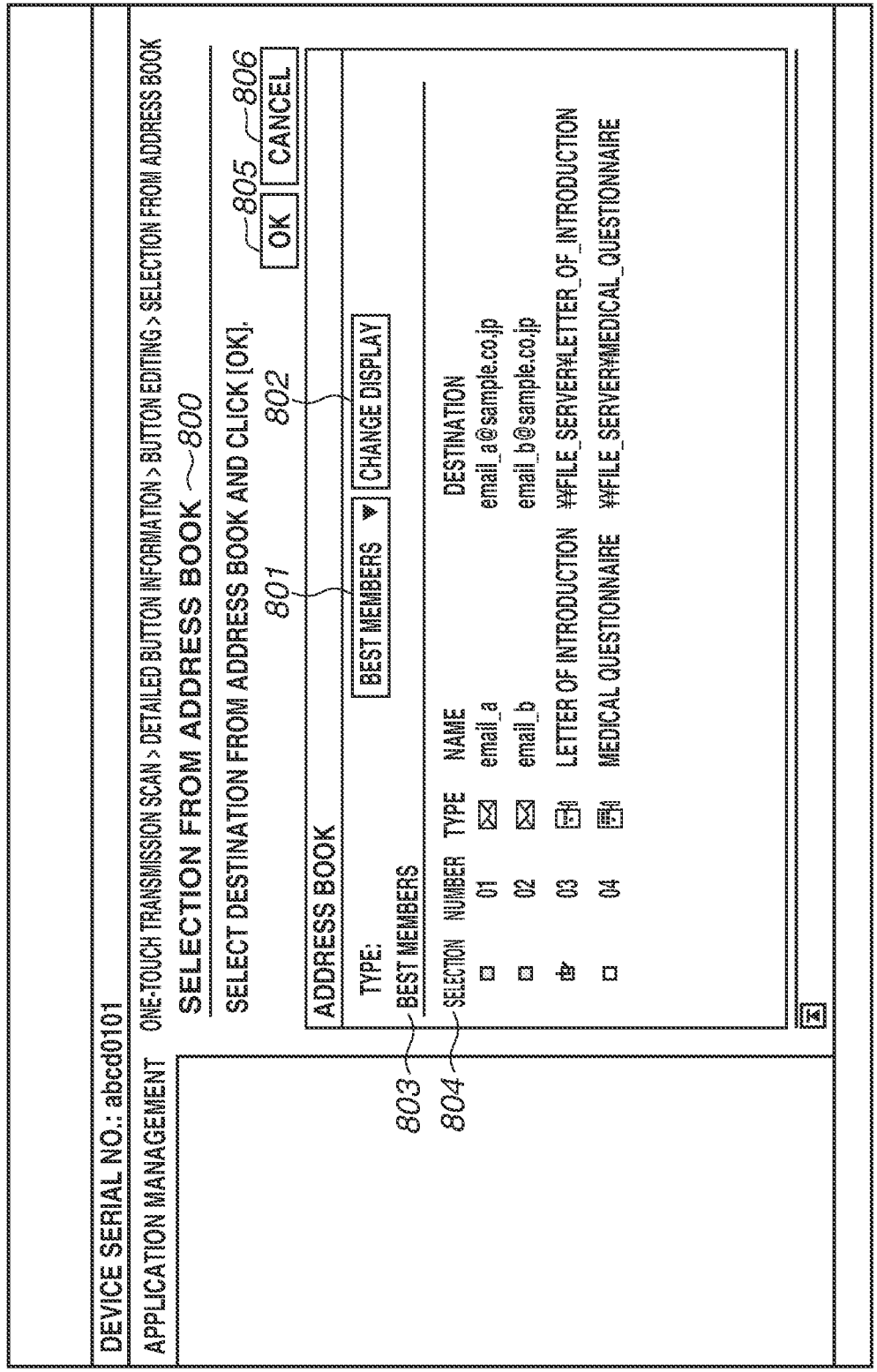
FIG. 8 illustrates an example of an address selection screen.

FIG. 8 illustrates an example of an address selection screen. The address selection screen 800 is displayed when the user selects the "Selection from Address Book" button 610 in the button setting editing screen 600 illustrated in FIG. 6. The address selection screen 800 illustrated in FIG. 8 is displayed, for example, on the display apparatus 311 connected to the PC 104 which is accessing the web server of the MFP 101 through HTTP communication.

A pull-down menu 801 is a list for changing the type of the address book to be displayed in the address selection screen 800. The pull-down menu 801 enables selection of either one of "Best Members" and "Abbreviated Dialing" (not illustrated).

A Change Display button 802 is used for changing, when selected by the user, the type of the address book to be displayed in the address selection screen 800 to the type displayed in the pull-down menu 801.

An area 803 is a display area where the name of the address book is displayed. A list 804 is an area where an address list is displayed. Each line in the list 804 includes Selection (a selectable check box, Number, Type, Name, and Destination. For Selection, either one of a checkable check box and an uncheckable check box is displayed. For Number, the address management number is displayed. For Type, where an icon is displayed, a different icon is displayed based on the address type. For Name, the name assigned to the address is displayed. For Destination, the address is displayed.

When an OK button 805 is selected in a state where the check box is checked, the address is displayed in the area 609. The MFP 101 receives the address from the PC 104 through HTTP communication and stores the address in the storage 204 as the destination address of the image data.

Supplementary information about the display of a checkable check box and an uncheckable check box will be described below. FIG. 8 illustrates a screen display when the user selects an address from the address book "Best Members" in a state where "File" is selected in the pull-down menu 606 illustrated in FIG. 6. In the address book "Best Members", two addresses with the "File" transmission type and two addresses with the "E-mail" transmission type are registered. In the address selection screen 800, destinations corresponding to the set transmission type are selectable with checkable check boxes in this way. For an address of which the type match the type in the pull-down menu 606, a checkable check box is displayed. More specifically, an uncheckable check box is displayed for addresses with Numbers 01 and 02, and a checkable check box is displayed for addresses with Numbers 03 and 04.

The OK button 805 is used for determining address selection based on the setting values in the address selection screen. A Cancel button 806 is used for canceling the setting values. When the OK button 805 or the Cancel button 806 is selected, the button setting editing screen 600 illustrated in FIG. 6 is displayed.

A setting for the Medical Questionnaire button 405 according to the present exemplary embodiment will be described below. The Medical Questionnaire button 405 is registered in a state where "Medical Questionnaire" is input to the input field 601, "Button Name" is selected from the pull-down menu 602, and the check box 603 is checked in the button setting editing screen 600 illustrated in FIG. 6. The Medical Questionnaire button 405 is registered in a state where "Organize (Folder)" is selected from the pull-down menu 605 and "File" is selected from the pull-down menu 606 in the button setting editing screen 600 illustrated in FIG. 6. The Medical Questionnaire button 405 is registered in a state where "Numeric Only" is selected from the pull-down menu 701, "7" is input to the input field 702, and "Input Patient Number" is input to the input field 703 in the keyword character string setting screen 700 illustrated in FIG. 7. The Medical Questionnaire button 405 is registered in a state where "Enable" is selected from the pull-down menu 704, the Specify Area button 706 is not selected, and Destination "\\file_server\medical_questionnaire" for Number 04 is selected in the address selection screen 800 illustrated in FIG. 8.

A setting of the Letter Of Introduction button 406 according to the present exemplary embodiment will be described below. The Letter Of Introduction button 406 is generated when "Letter Of Introduction" is input to the input field 601, "Button Name" is selected from the pull-down menu 602, and the check box 603 is checked in the button setting editing screen 600 illustrated in FIG. 6. The Medical Questionnaire button 405 is generated when "Organize (File and Folder)" is selected from the pull-down menu 605 and "File" is selected from the pull-down menu 606 in the button setting editing screen 600 illustrated in FIG. 6. Further, the Letter Of Introduction button 406 is generated when "Numeric Only" is selected "7" from the pull-down menu 701, "7" is input to the input field 702, and "Input Patient Number" is input to the input field 703 in the keyword character string setting screen 700 illustrated in FIG. 7. The Letter Of Introduction button 406 is generated when "Enable" is selected from the pull-down menu 704, the Specify Area button 706 is selected, and "starting point (X, Y)=(10, 10) and ending point (X, Y)=(50, 20)" are set. The Letter Of Introduction button 406 is registered in a state where Destination "\\file_server\letter_of_introduction" of Number 03 is selected in the address selection screen 800 illustrated in FIG. 8.

FIG. 9 illustrates an example of a button setting editing screen having a transmission type of "E-mail". A button setting editing screen 900 illustrated in FIG. 9 will be described below with an example of the settings of an "Application A" button. The button setting editing screen 900 illustrated in FIG. 9 is displayed, for example, on the display apparatus 311 connected to the PC 104 which is accessing the web server of the MFP 101 through HTTP communication.

An input field 901, pull-down menus 902, 905, and 906, a check box 903, and a keyword character string setting button 904 are similar to the input field 601, the pull-down menus 602, 605, and 606, the check box 603, and the keyword character string setting button 604, respectively, illustrated in FIG. 6, and redundant descriptions thereof will be omitted.

When "E-mail" is selected from the pull-down menu 906 and the Change button 907 is selected, transmission settings for an item 908 are displayed as illustrated in the button setting editing screen 900.

An input field 909 is used for inputting the mail address of the transmission destination of image data generated by scanning a document.

An Add button 910, when selected by the user, adds the mail address input to the input field 909 to a destination list 911.

The destination list 911 is a text display area from which for each mail address can be selected. The destination list 911 displays the field name and mail address when transmitting an e-mail. Any of "To", "Cc", and "Bcc" is displayed as the field name in transmitting an e-mail. The initial value of the field name in adding a mail address to the destination list 911 is "To".

A "Select from Address Book" button 912 is used for displaying, when selected by the user, displays the address selection screen 800 for selecting a mail address to be added to the destination list 911, from the address book.

A "Select To/Cc/Bcc" changing button 913, when selected by the user, changes the field of the mail address selected in the destination list 911. Each time this button is selected, To, Cc, and Bcc is cyclically changed in this order.

A Delete button 914, when selected by the user, deletes the mail address selected in the destination list 911 from the destination list 911.

An input field 915 is used to input the subject of the e-mail to be transmitted. When an Add Button Name button 916 is selected, the button name input to the input field 901 is input to the input field 915.

An input field 917 is used for inputting the body text of the e-mail to be transmitted. When an Add Button Name button 918 is selected, the button name input to the input field 901 is input to the input field 917.

An OK button 919 and a Cancel button 920 are similar to the OK button 612 and the Cancel button 613, respectively. In a case where a one-touch transmission button having a transmission type of "E-mail" is selected, the character recognition processing is not performed.

FIG. 10 illustrates an example of a button setting editing screen which is displayed in a case where the transmission type is "USB Memory". A button setting editing screen 1000 illustrated in FIG. 10 will be described below with an example of the settings of an "Application B" button. The button setting editing screen 1000 illustrated in FIG. 10 is displayed, for example, on the display apparatus 311 connected to the PC 104 which is accessing the web server of the MFP 101 through HTTP communication.

An input field 1001, pull-down menus 1002, 1005, and 1006, a check box 1003, and a keyword character string setting button 1004 are similar to the input field 601, the pull-down menus 602, 605, and 606, the check box 603, and the keyword character string setting button 604, respectively, illustrated in FIG. 6, and redundant descriptions thereof will be omitted.

When USB Memory is selected from the pull-down menu 1006 and the Change button 1007 is selected, transmission settings for an item 1008 are displayed as illustrated in the button setting editing screen 1000. The item 1008 enables the user to make scan settings when scanning a document to generate image data, such as the reading size, the color setting, and the format of a file to be generated.

When the transmission type is "USB Memory", image data generated by scanning an image of a document is stored in a USB memory.

An address registration screen which is displayed in the address selection screen 800 illustrated in FIG. 8 will be described below.

FIGS. 12A and 12B illustrate examples of screens for registering an address in the address book. The screens illustrated in FIGS. 12A and 12B are displayed on the display apparatus 311 connected to the PC 104 when the PC 104 accesses the web server of the MFP 101 through HTTP by using a web browser.

FIG. 12A illustrates an example of an address registration screen. An address registration screen 1200 displays an address book selection area 1201, check boxes 1202, an OK button 1203, and a Cancel button 1204.

In the address book selection area 1201, "Abbreviated Dialing" and "Best Members" can be selected. FIGS. 12A and 12B illustrate a case where "Best Members" is selected.

The type of the destination to be registered can be selected with the check boxes 1202. The OK button 1203 is used for displaying, when selected by the user, a destination registration screen 1210 illustrated in FIG. 12B on which the selected destination type is reflected.

The Cancel button 1204 is used for canceling the settings and the address book registration process when selected by the user.

FIG. 12B illustrates an example of a destination registration screen. The destination registration screen 1210 displays input fields 1211, 1213, 1214, 1215, and 1216, a pull-down menu 1212, an OK button 1217, and a Cancel button 1218. The destination registration screen 1210 is used for registering a destination when the transmission type is "File" transmission.

The input field 1211 is used to input the name of a destination. The pull-down menu 1212 is an object for selecting the protocol to be used in transmitting image data to the transmission destination. The pull-down menu 1212 enables selecting a protocol from SMB, FTP, and WebDAV.

The input field 1213 is used for inputting the host name of a transmission destination, i.e., a name-resolvable server name or Internet Protocol (IP) address. The input field 1214 is used for inputting the folder path of the destination.

The input fields 1215 and 1216 are the input fields for entering the user name and password for accessing the server specified with the host name input to the input field 1213.

When the OK button 1217 is selected by the user, the CPU 201 stores the input setting values in the storage 204 as a new destination. The Cancel button 1218, when selected by the user, cancels the settings and the address book registration process.

Figure 13:
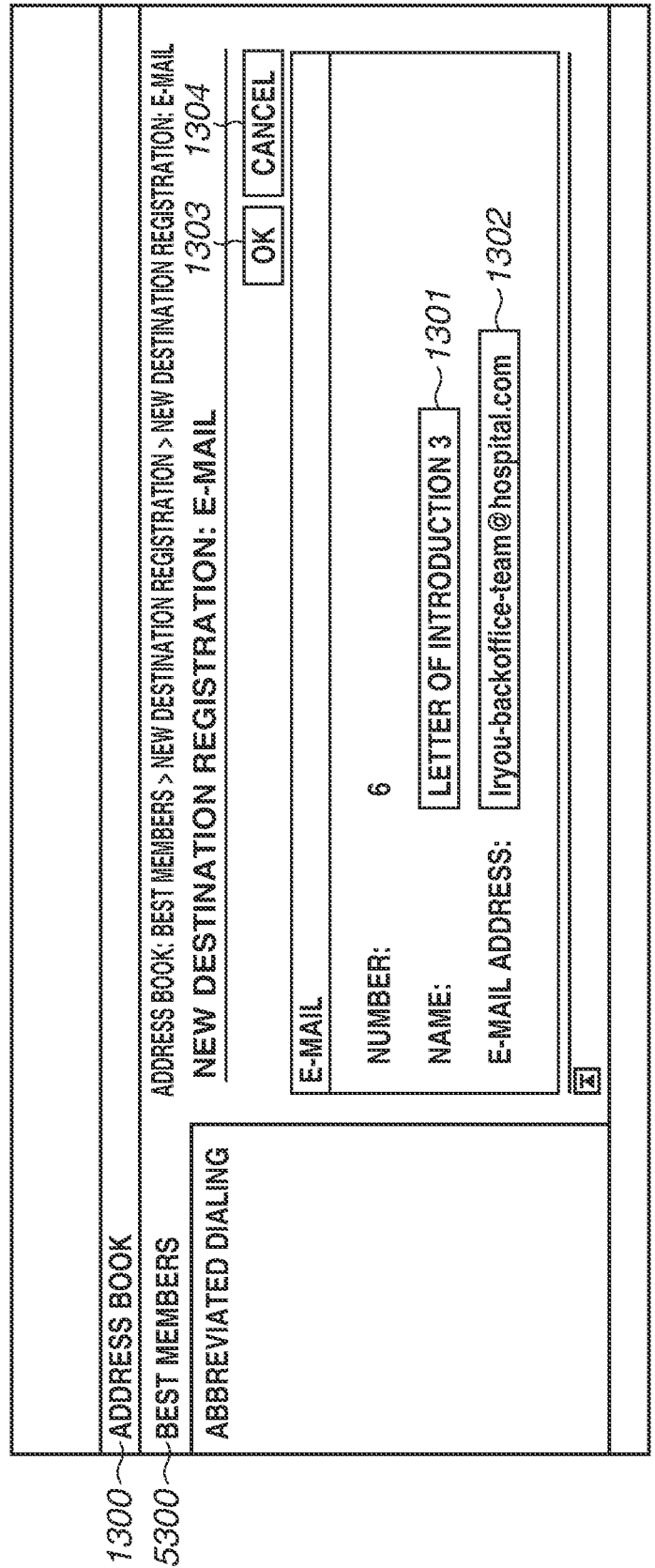
FIG. 13 illustrates an example of an address registration screen.

FIG. 13 illustrates an example of an address registration screen. An address registration screen 1300 displays input fields 1301 and 1302, an OK button 1303, and a Cancel button 1304. The address registration screen 1300 is used for registering an address when the transmission type is "E-mail" transmission. The address registration screen 1300 illustrated in FIG. 13 is displayed, for example, on the display apparatus 311 connected to the PC 104 which is accessing the web server of the MFP 101 through HTTP communication.

The input field 1301 is used to input the name of an address. The input field 1302 is used to input the mail address of a transmission destination.

When the OK button 1303 is selected by the user, the CPU 201 stores the input setting values in the storage 204 as a new address. The Cancel button 1304, when selected by the user, cancels the settings and the address book registration process.

This completes descriptions of the processing for pre-registering a button. Processing which is performed when the user uses the registered button will be described below. Some or all of the above-described screens may be displayed and used to receive operations on the operation unit 205 of the MFP 101, or displayed and used for receiving operations on the PC 104 connected to the web server of the MFP 101.

Figure 14:
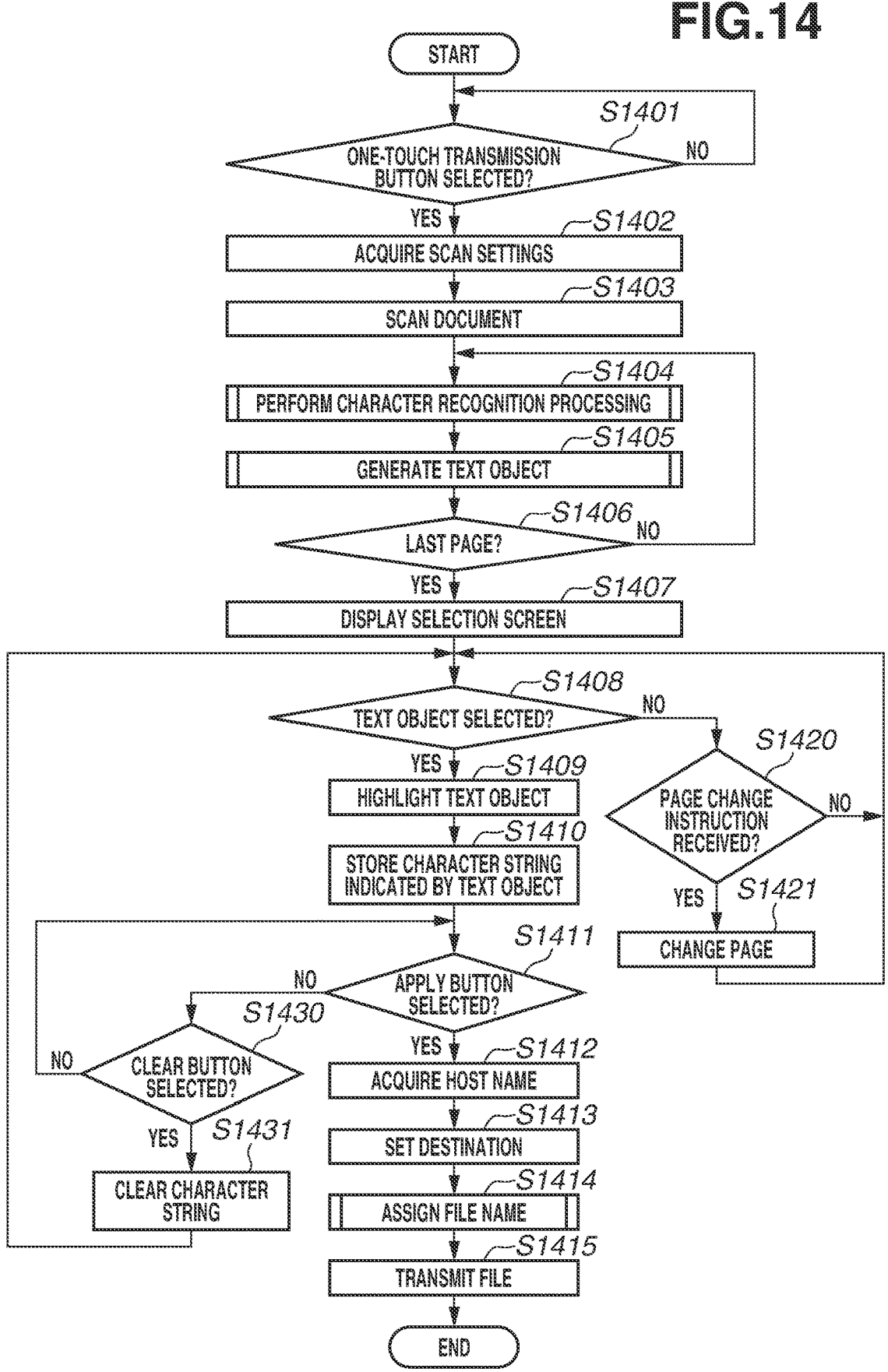
FIG. 14 is a flowchart illustrating an example of a flow of processing which is performed when a one-touch transmission button for file transmission is selected on the MFP.

FIG. 14 is a flowchart illustrating an example of a flow of processing which is performed when a one-touch transmission button for file transmission is selected on the MFP 101. Processing of the flowchart illustrated in FIG. 14 is implemented by the CPU 201 loading a program stored in the ROM 202 into the RAM 203 and executing the program. The flowchart illustrated in FIG. 14 is started when the power of the MFP 101 is turned ON. The flowchart illustrated in FIG. 14 may be executed in a case where the transmission type of the one-touch transmission button is "File" transmission. In a case where the transmission type is "E-mail" or "USB Memory", the character recognition processing may not be executed, as illustrated in FIG. 14.

In step S1401, the CPU 201 determines whether a one-touch transmission button is selected. If the CPU 201 determines that a one-touch transmission button is selected (YES in step S1401), the processing proceeds to step S1402. If the CPU 201 determines that a one-touch transmission button is not selected (NO in step S1401), the processing returns to step S1401. Here, a case where the Medical Questionnaire button 405 is selected as a one-touch transmission button will be described below.

In step S1402, the CPU 201 reads scan settings made in the setting editing screen 600 from the storage 204.

In step S1403, based on the scan settings read in step S1402, the CPU 201 controls the scanner 207 to scan an image of a document to generate image data.

In step S1404, the CPU 201 performs the character recognition processing by using the generated image data. The character recognition processing will be described below in detail with reference to FIG. 15.

Figure 15:
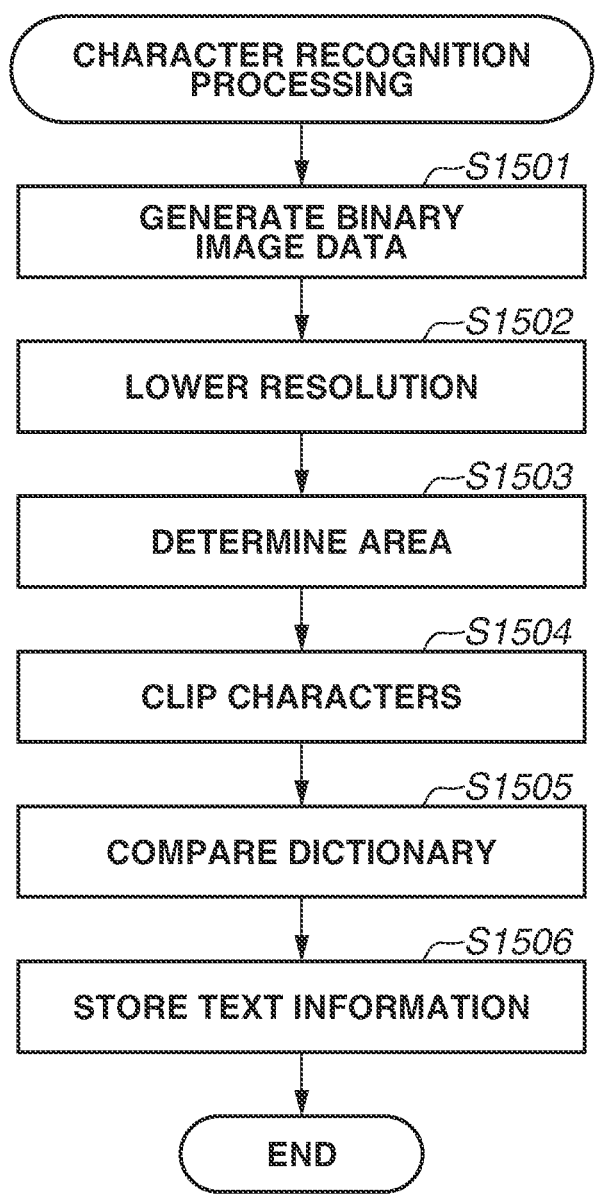
FIG. 15 is a flowchart illustrating an example of character recognition processing.

FIG. 15 is a flowchart illustrating an example of the character recognition processing. Processing of the flowchart illustrated in FIG. 15 is implemented by the CPU 201 loading a program stored in the ROM 202 into the RAM 203 and executing the program. The flowchart illustrated in FIG. 15 is started when "Enable" is selected for the character recognition from the pull-down menu 704, and the CPU 201 scans an image of a document to generate image data in step S1403.

In step S1501, the CPU 201 generates binary image data by using the image data generated in step S1403. The generated binary image data is stored in the RAM 203.

In step S1502, the CPU 201 reduces the resolution of the binary image data generated in step S1501. Reducing the resolution leads to a reduction in the load of processing for searching for a character area from the binary image data.

In step S1503, the CPU 201 searches for a character area in an image indicated by the binary image data with the reduced resolution. A range to be subjected to character area search may be the entire range of the image data or an area set by the user.

In step S1504, the CPU 201 performs character clipping process on the area determined as a character area in step S1503. The character clipping process is processing for clipping the circumscribed rectangle of each character as a character clipping rectangle based on the projection from the horizontal direction and the projection from the vertical direction. This character clipping process is performed on all of the areas which are determined as character areas.

In step S1505, the CPU 201 compares each character clipping rectangle with dictionary data stored in the ROM 202 and acquires the character code of the most similar character and coordinate information about the character clipping rectangle. This dictionary comparison processing is performed on all of the character clipping rectangles. In this processing, the CPU 201 may acquire font information in addition to the character code and coordinate information.

In step S1506, the CPU 201 stores character information, that is, character code and coordinate information, acquired in step S1505 in the RAM 203.

The flowchart illustrated in FIG. 14 will be described again below. In step S1405, the CPU 201 generates a text object by using the character information. Processing for generating a text object will be described in detail below with reference to FIG. 16.

Figure 16:
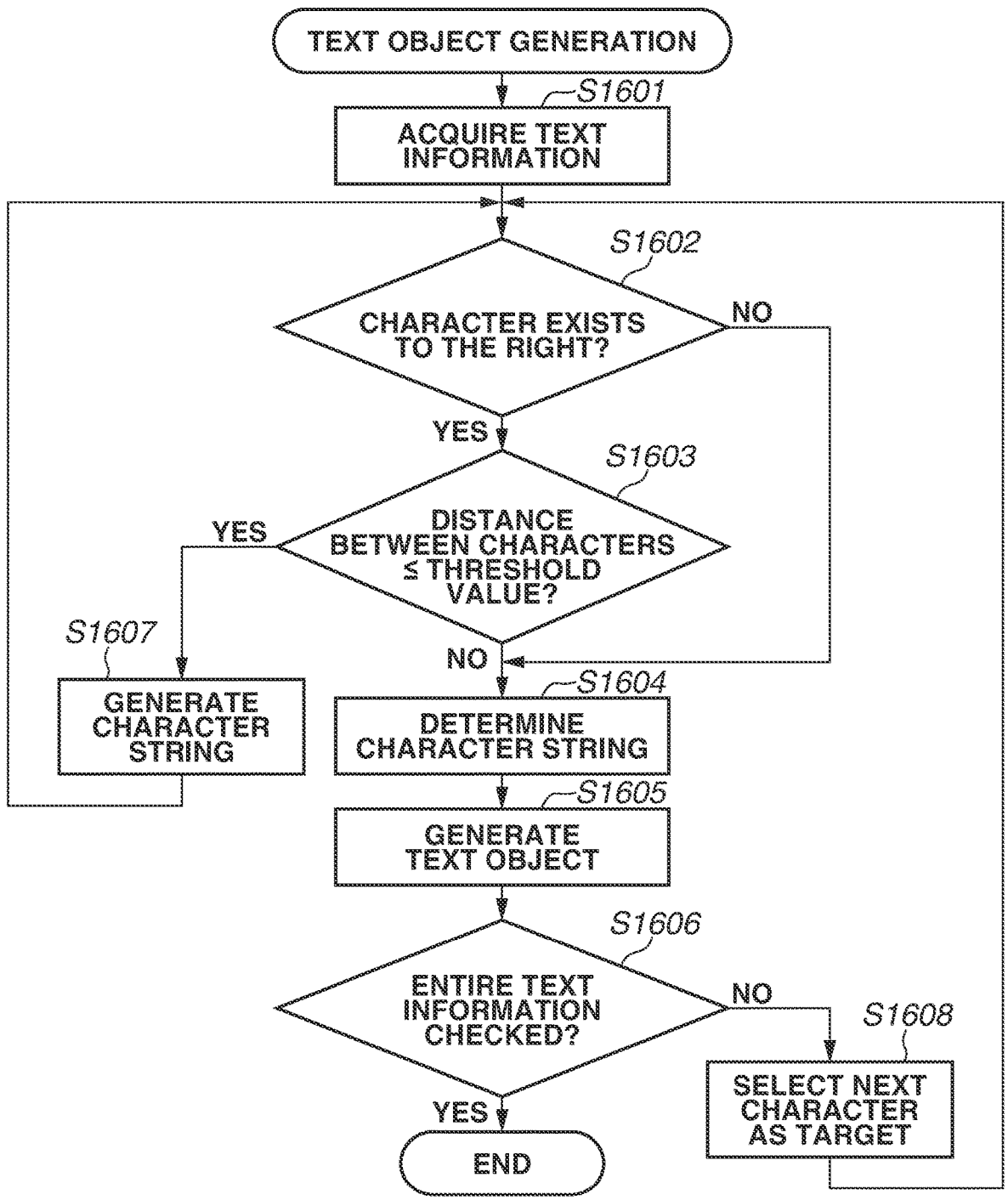
FIG. 16 illustrates an example of a flow of processing which is performed by the MFP to generate a text object.

FIG. 16 is an example of a flow of processing which is performed by the MFP 101 to generate a text object. Processing of the flowchart illustrated in FIG. 16 is implemented by the CPU 201 loading a program stored in the ROM 202 into the RAM 203 and executing the program. The flowchart illustrated in FIG. 16 is started upon completion of the character recognition processing for one page in step S1404.

In step S1601, the CPU 201 acquires the character information stored in step S1506. In step S1602, the CPU 201 determines whether a character (character clipping rectangle) exists to the right of the character clipping rectangle at the upper left coordinates of the image represented by the image data. If the CPU 201 determines that a character exists (YES in step S1602), the processing proceeds to step S1603. If the CPU 201 determines that a character does not exist (NO in step S1602), the processing proceeds to step S1604.

In step S1603, the CPU 201 determines whether the distance to the character (character clipping rectangle) to the right is a threshold value or below. If the CPU 201 determines that the distance is the threshold value or below (YES in step S1603), the processing proceeds to step S1607. If the CPU 201 determines that the distance is larger than the threshold value (NO in step S1603), the processing proceeds to step S1604.

In step S1607, the CPU 201 combines a target character with the character to the right of the target character to generate a character string. The CPU 201 then selects the character to the right as the target character. The processing returns to step S1602.

In step S1604, the CPU 201 stores one character string or combined character strings in the RAM 203 as one character string to be used for a text object.

In step S1605, the CPU 201 generates a text object by using the character string stored in the RAM 203 in step S1604. In this case, a text object refers to a button in which a character string is displayed.

In step S1606, the CPU 201 determines whether all of pieces of the character information have been checked. If the CPU 201 determines that all of pieces of the character information have been checked (YES in step S1606), the processing exits the flowchart. If the CPU 201 determines that not all of pieces of the character information have been checked (NO in step S1606), the processing proceeds to step S1608.

In step S1608, the CPU 201 selects the next character as the target character. The processing then returns to step S1602. In a case where the processing returns to step S1602, the CPU 201 selects the character to the right as the next character and, after checking the rightmost character, selects the character at the left end of the row one below as the next character. The CPU 201 may change the position of the character to be selected next based on the character writing direction of the document.

Return to the description of the flowchart illustrated in FIG. 14. In step S1406, the CPU 201 determines whether the page having been subjected to the character recognition processing and text object generation processing is the last page of the images scanned in step S1403. If the CPU 201 determines that the page is the last page (YES in step S1406), the processing proceeds to step S1407. If the CPU 201 determines that the page is not the last page (NO in step S1406), the processing returns to step S1404 for the next page.

In step S1407, the CPU 201 displays a screen for selecting a text object. An example of a selection screen which is displayed here is illustrated in FIG. 17.

FIG. 17 illustrates an example of a selection screen 1700. An area 1701 displays the folder path selected in the address selection screen 800. A preview image 1702 is an image of a scanned document.

A list 1703 is a list for displaying, for example, the text objects generated in step S1605. This list displays the text objects ranging from the one corresponding to the upper left character clipping rectangle to the one corresponding to the lower right character clipping rectangle.

An area 1704 displays the character string represented by a text object selected from the list 1703. The character string represented by the selected text object is stored in the RAM 203. Referring to FIG. 17, a text object 1705 is selected, and thus "123" represented by the text object 1705 is displayed in the area 1704. As in the text object 1705, the selected text object is highlighted. The character string in the preview image is also highlighted as in the area 1710.

A Previous button 1706 is used for changing, when selected by the user, the currently displayed preview image and list to the ones corresponding to the previous page.

A Next button 1707 is used for changing, when selected by the user, the currently displayed preview image and list to the ones corresponding to the next page.

An Apply button 1708 is used for transmitting, when selected by the user, the generated image data to the folder path as a combination of the character strings displayed in the areas 1701 and 1704 at the time when the Apply button 1708 is selected. More specifically, the image data is transmitted to the folder indicated by a folder path including the folder path displayed in the area 1701 and the name of a folder the name of which is the character string displayed in the area 1704, where the name of the folder is added to one lower level of the folder path displayed in the area 1701

A Clear button 1709 is used for deleting the character string currently displayed in the area 1704, from the area 1704 and the RAM 203.

Return to the description of the flowchart illustrated in FIG. 14. In step S1408, the CPU 201 determines whether the text object in the list 1703 is selected, i.e., the character represented by the text object is selected. If the CPU 201 determines that the text object is selected (YES in step S1408), the processing proceeds to step S1409. If the CPU 201 determines that the text object is not selected (NO in step S1408), the processing proceeds to step S1420.

In step S1409, the CPU 201 highlights the selected text object and the character string in the preview image corresponding to the text object. Highlighting the character string in the preview image enables the user to easily recognize which portion of the document the selected character string is. For example, when the user views the preview image, the highlighted character string enables the user to easily recognize whether the title of the document is selected or the value of a specific item, such as the patient ID, is selected.

In step S1410, the CPU 201 stores the character string represented by the selected text object in the RAM 203.

In step S1411, the CPU 201 determines whether the Apply button 1708 is selected. When the CPU 201 determines that the Apply button 1708 is selected (YES in step S1411), the processing proceeds to step S1412. If the CPU 201 determines that the Apply button 1708 is not selected (NO in step S1411), the processing proceeds to step S1430.

In step S1412, the CPU 201 acquires the host name (folder path) currently displayed in the area 1701. Referring to FIG. 17, the host name (folder path) is "\\file_server\medical_questionnaire\".

In step S1413, the CPU 201 combines the folder path acquired in step S1412 with the character string stored in step S1410 and sets the resultant folder path as the transmission destination of the image data generated in step S1403. Referring to FIG. 17, the resultant folder path is "\\file_server\medical_questionnaire\123".

In step S1414, the CPU 201 generates a file based on the generated image data and assigns a file name to the file. This processing will be described in detail below with reference to FIG. 20.

Figure 20:
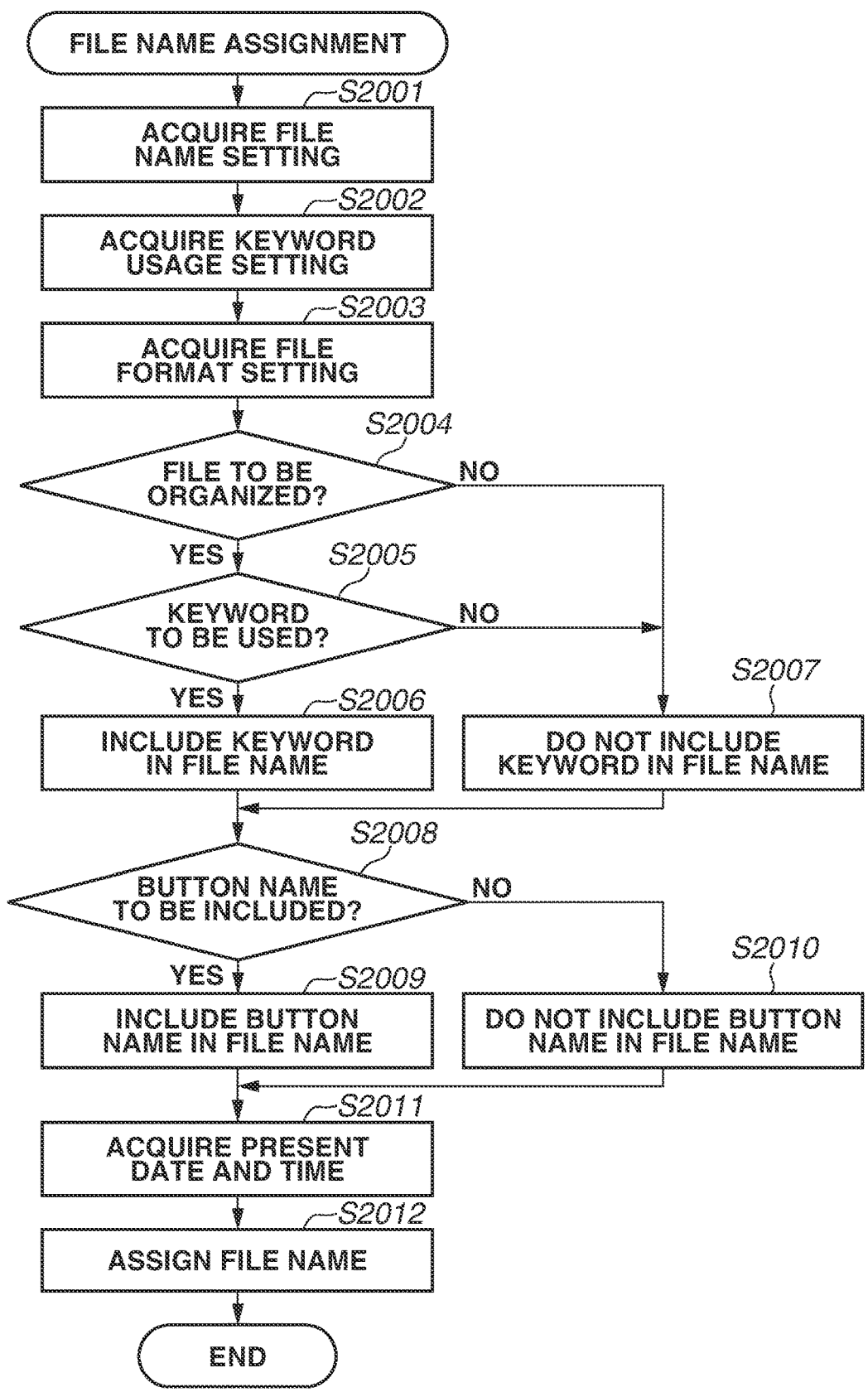
FIG. 20 is a flowchart illustrating an example of file name assignment processing.

FIG. 20 is a flowchart illustrating an example of file name assignment processing. Processing of the flowchart illustrated in FIG. 20 is implemented by the CPU 201 loading a program stored in the ROM 202 into the RAM 203 and executing the program. The flowchart illustrated in FIG. 20 is started upon completion of the processing in step S1413. The flowchart illustrated in FIG. 20 is also started upon completion of processing in step S1911 (described below).

In step S2001, the CPU 201 acquires information indicating the setting selected from the pull-down menu 602 in the button setting editing screen 600, from the storage 204, and stores the information in the RAM 203.

In step S2002, the CPU 201 acquires information indicating the setting of the check box 603 in the button setting editing screen 600, from the storage 204, and stores the information in the RAM 203.

In step S2003, the CPU 201 acquires information indicating the setting selected from the pull-down menu 611 in the button setting editing screen 600, from the storage 204, and stores the information in the RAM 203.

In step S2004, the CPU 201 determines whether the file organization is set. If "Organize" (File) or "Organize (File and Folder)" is selected in the button setting editing screen 600, i.e., the CPU 201 determines to perform the file organization (YES in step S2004), the processing proceeds to step S2005. If "Do Not Organize" or "Organize (Folder)" is selected in the button setting editing screen 600, i.e., the CPU 201 determines not to perform the file organization (NO in step S2004), the processing proceeds to step S2007.

In step S2005, the CPU 201 determines whether to use a keyword (the character string of a selected text object) to determine a file name based on the information acquired in step S2002. More specifically, if the check box 603 is checked, i.e., the CPU 201 determines to use a keyword (YES in step S2005), the processing proceeds to step S2006. If the check box 603 is not checked, i.e., the CPU 201 determines not to use a keyword (NO in step S2005), the processing proceeds to step S2007.

In step S2006, the CPU 201 stores a flag indicating that a keyword is to be included in a file name, in the RAM 203.

In step S2007, the CPU 201 stores a flag indicating that a keyword is not to be included in a file name, in the RAM 203. In this processing, the CPU 201 may store no flag.

In step S2008, the CPU 201 determines whether to use a button name to determine a file name based on the settings acquired in step S2001. More specifically, if "Button Name" is selected from the pull-down menu 602, i.e., the CPU 201 determines to use a button name (YES in step S2008), the processing proceeds to step S2009. If "Automatic" is selected from the pull-down menu 602, i.e., the CPU 201 determines not to use a button name (NO in step S2008), the processing proceeds to step S2010.

In step S2009, the CPU 201 stores a flag indicating that a button name is to be included in a file name, in the RAM 203.

In step S2010, the CPU 201 stores a flag indicating that a button name is not to be included in a file name, in the RAM 203. In this processing, the CPU 201 may store no flag.

In step S2011, the CPU 201 acquires the present date and time and stores them in the RAM 203.

In step S2012, the CPU 201 checks the flag stored in the RAM 203 and determines a file name based on the flag and the present date and time stored in step S2011. Although this processing has been described to include a keyword and a button name in a file name, the processing is not limited thereto. For example, the CPU 201 may acquire only the present date and time and assign them to the file name.

Return to the description of the flowchart illustrated in FIG. 14. In step S1415, the CPU 201 transmits the file generated in step S1414 to the destination set in step S1413.

In step S1420, the CPU 201 determines whether instruction to switch between the preview image and the list is received by the Previous button 1706 or the Next button 1707 having been selected. If the CPU 201 determines that the instruction is received (YES in step S1420), the processing proceeds to step S1421. If the CPU 201 determines that the instruction is not received (NO in step S1420), the processing returns to step S1408.

In step S1421, the CPU 201 displays the preview image and the list of the text object of the page corresponding to the selected button.

In step S1430, the CPU 201 determines whether the Clear button 1709 is selected. If the CPU 201 determines that the Clear button 1709 is selected (YES in step S1430), the processing proceeds to step S1431. If the CPU 201 determines that the Clear button 1709 is not selected (NO in step S1430), the processing returns to step S1411.

In step S1431, the CPU 201 deletes the character string currently displayed in the area 1704 from the area 1704 and the RAM 203.

Performing the above-described processing achieves a reduction in the user's work in an image processing apparatus that scans an image of a document to generate image data and transmits the image data to a destination folder based on a character string obtained by performing the character recognition processing on the image data.

Although, in the present exemplary embodiment, the MFP 101 scans an image of a document to generate image data and performs the character recognition processing and text object generation processing when a one-touch transmission button is selected, the present disclosure is not limited thereto. For example, the MFP 101 may receive image data transmitted from an external apparatus, and perform the character recognition processing and text object generation processing on the image data, and display a screen as illustrated in FIG. 17. The MFP 101 may scan an image of a document to generate image data, and perform the character recognition processing and text object generation processing when the Scan button 402 is selected.

Although, in the present exemplary embodiment, a description has been provided of an example where setting screens, such as the button setting editing screen 600, are displayed on the display apparatus 311 connected to the PC 104 through HTTP communication, the present disclosure is not limited thereto. For example, setting screens, such as the button setting editing screen 600, may be displayed on the touch panel 410 on the operation unit 205 of the MFP 101 and receive operations.

A second exemplary embodiment of the present disclosure will be described below. The first exemplary embodiment has been described centering on the processing for displaying a selection screen as illustrated in FIG. 17 and determining the destination of image data when a text object on the selection screen is selected. The present exemplary embodiment will be described below with an example where an area to be subjected to the character recognition processing is specified in advance, and a character string which is recognized in the area is determined as the destination of image data.

Figure 18:
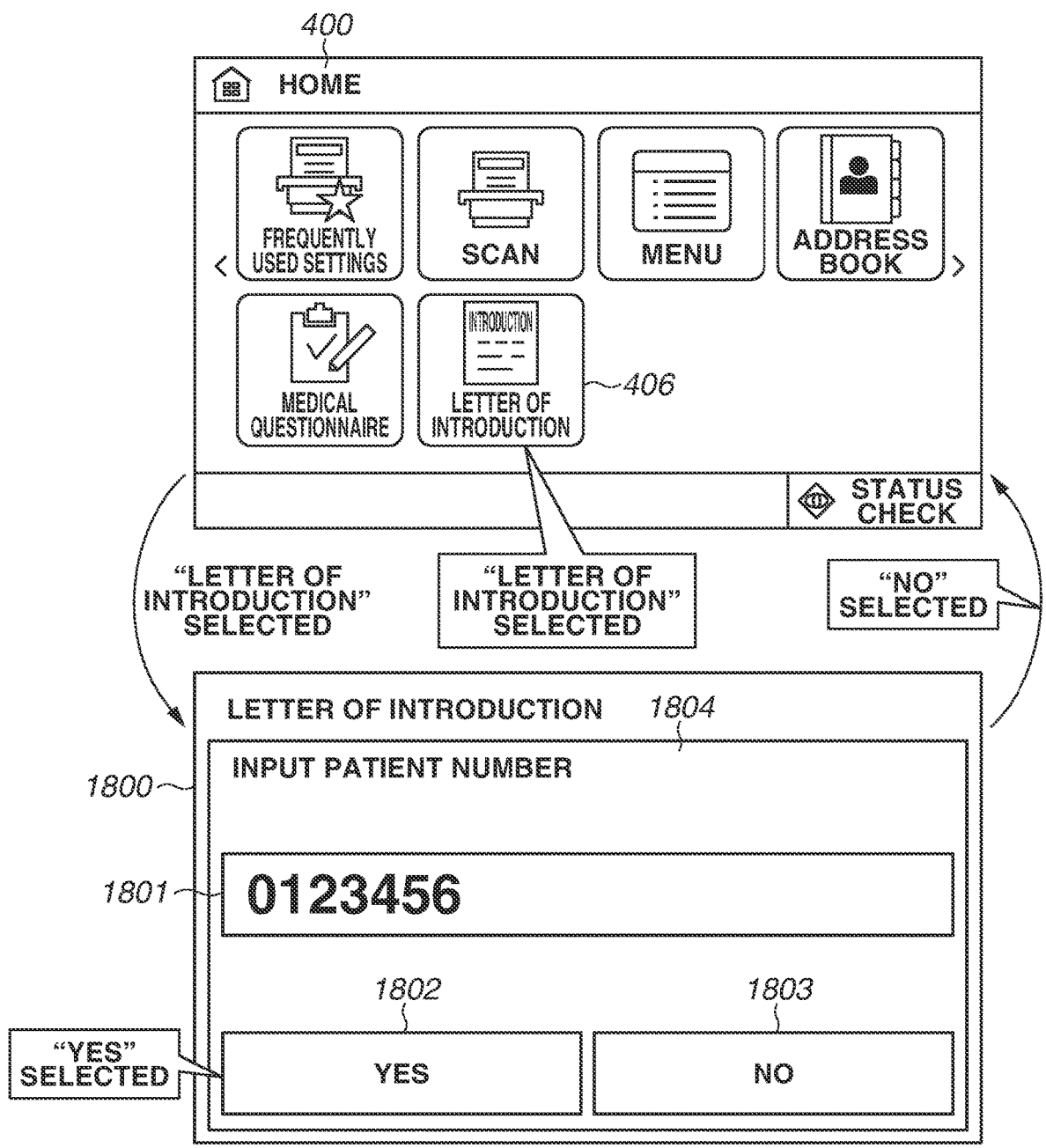
FIG. 18 illustrates an example of a screen transition when a Letter Of Introduction button is selected on the MFP.

FIG. 18 illustrates an example of a screen transition when the Letter Of Introduction button 406 is selected on the MFP 101. FIG. 18 illustrates a flow of processing for transmitting image data generated by an image of a document being scanned with the scanner 207. The screens illustrated in FIG. 18 are displayed on the touch panel 410 of the operation unit 205.

After placing a document on the scanner 207, the user selects the Letter Of Introduction button 406 in the Home screen 400. When the Letter Of Introduction button 406 is selected, the CPU 201 starts scanning the document based on the scan settings pre-registered to the button in the screen illustrated in FIG. 6, and performs the character recognition processing on the scanned document in the area set in the character recognition area setting screen 1100, based on the character type and the limitation on the number of characters. In this case, the CPU 201 extracts only character strings corresponding to the character type set with the pull-down menu 701 illustrated FIG. 7 in the area set in the character recognition area setting screen 1100, and stores them in the RAM 203. The CPU 201 then displays a character string applying to the number of characters input in the input field 702 illustrated in FIG. 7 out of character strings stored in the RAM 203, for example, on a Letter Of Introduction button screen 1800. If a plurality of character strings satisfying the above-described two conditions is extracted, the CPU 201 may preferentially display the character string recognized at the uppermost portion in the set area. In the Letter Of Introduction button screen 1800, the character string "Input Patient Number" input to the input field 703 illustrated in FIG. 7 is displayed in an area 1804. An input field 1801 for inputting a patient number is also displayed. The patient number determined through the character recognition processing is automatically input to the input field 1801. In this case, limiting the character type with the pull-down menu 701 illustrated in FIG. 7 reduces the search range. This makes it possible to perform high-accuracy processing, with reduced recognition errors, in a short period of time. The recognition accuracy further increases by limiting the number of characters in the input field 702. For example, when the number of characters is limited to 1, a recognition error of recognizing "cl" as "d" does not occur for a character string "d". When a character recognition area is set, it is not necessary to perform the recognition processing on the entire area of the document, making it possible to perform processing in a short period of time.

If the user selects a "No" button 1803, the display screen returns to the Home screen. If the patient number ("0123456" illustrated in FIG. 18) satisfies the conditions of the character type and the number of characters and if the user selects a "Yes" button 1802, the image data is transmitted to the destination set in the button setting editing screen 600. If not, a pop-up screen appears to call for attention. According to this screen transition, the user is able to perform data transmission with at least two touch operations.

Figure 19:
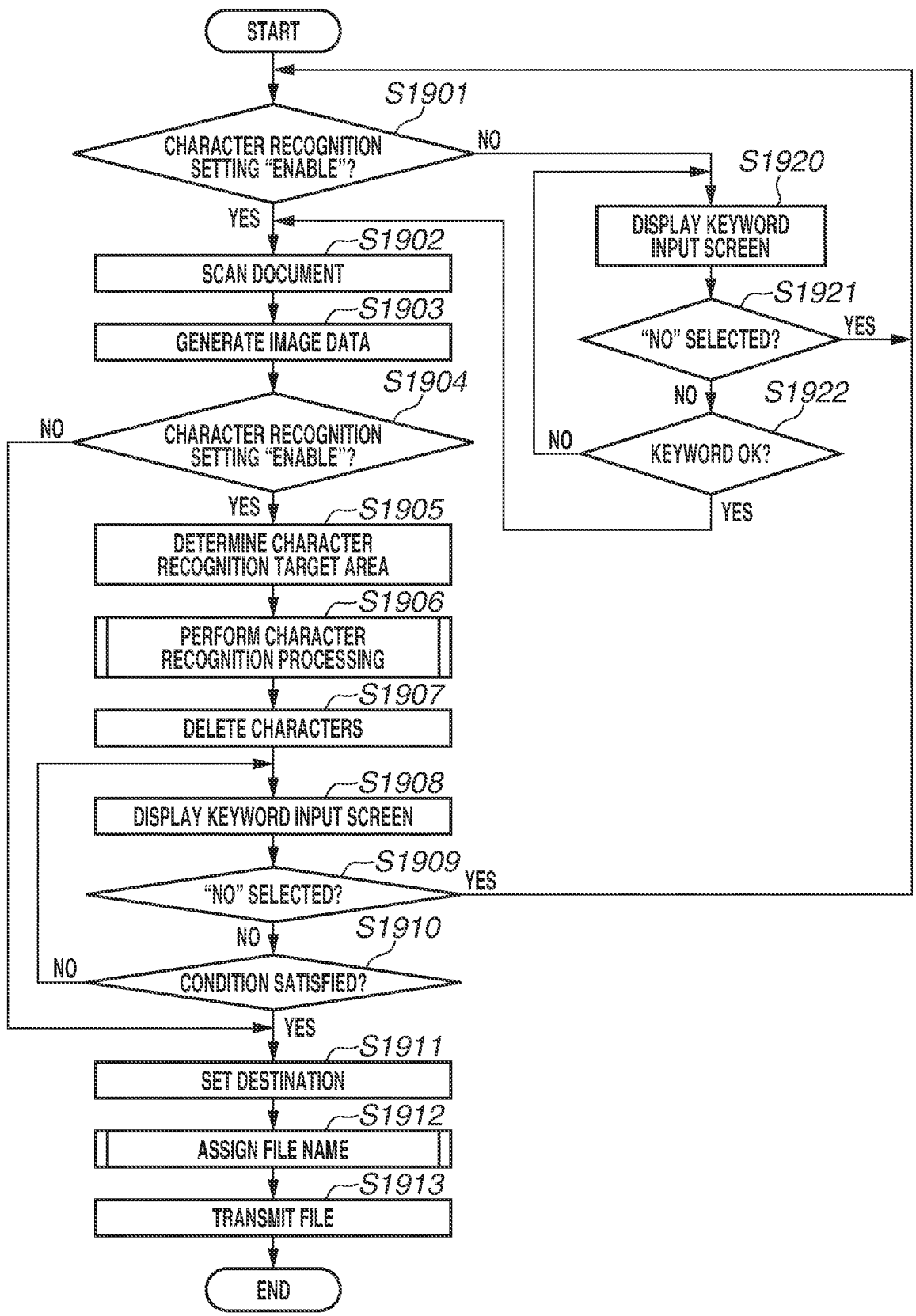
FIG. 19 is a flowchart illustrating an example of processing which is performed when a user selects the Letter Of Introduction button.

FIG. 19 is a flowchart illustrating an example of processing which is performed when the user selects the Letter Of Introduction button 406. Processing of the flowchart illustrated in FIG. 19 is implemented by the CPU 201 loading a program stored in the ROM 202 into the RAM 203 and then executing the program. The flowchart illustrated in FIG. 19 is started when the Home screen 400 is displayed on the touch panel 410 of the operation unit 205 of the MFP 101, and a one-touch transmission button is selected in the Home screen 400. This flowchart will be described below centering on processing which is performed when the Letter Of Introduction button 406 is selected.

In step S1901, the CPU 201 determines whether "Enable" is selected from the pull-down menu 704 for the "Character Recognition" setting in the keyword character string setting screen 700, for the Letter Of Introduction button 406. When "Enable" is selected (YES in step S1901), the processing proceeds to step S1902. If "Enable" is not selected (NO in step S1901), the processing proceeds to step S1920.

In step S1902, the CPU 201 controls the scanner 207 to scan an image of a document. In step S1903, based on the image scanned in step S1902, the CPU 201 generates image data based on the scan settings set to the Letter Of Introduction button 406.

In step S1920, the CPU 201 displays the Letter Of Introduction button screen 1800 illustrated in FIG. 18 as a keyword input screen on the touch panel 410 of the operation unit 205.

In step S1921, the CPU 201 determines whether the "No" button 1803 in the Letter Of Introduction button screen 1800 is selected by the user. If the CPU 201 determines that the "No" button 1803 is selected (YES in step S1921), the processing returns to step S1901. If the "Yes" button 1802 is selected (NO in step S1921), the processing proceeds to step S1922.

In step S1922, the CPU 201 determines whether the character string input to the input field 1801 satisfies the conditions of the number of characters and the character type set in the keyword character string setting screen 700. If the CPU 201 determines that the conditions are satisfied (YES in step S1922), the processing proceeds to step S1902. If the CPU 201 determines that the conditions are not satisfied (NO in step S1922), the processing returns to step S1920.

In step S1904, the CPU 201 determines whether "Enable" is selected for the "Character Recognition" setting in the keyword character string setting screen 700 for the Letter Of Introduction button 406. If "Enable" is selected (YES in step S1904), the processing proceeds to step S1905. If "Enable" is not selected (NO in step S1904), the processing proceeds to step S1911.

In step S1905, the CPU 201 determines the area set in the character recognition area setting screen 1100 illustrated in FIG. 11 as the area to be subjected to the character recognition (OCR) processing. In a case where the character recognition area setting screen 1100 is not set ("Not Specified" is selected for "Character Recognition Area"), the CPU 201 determines the entire document image area as the character recognition target area.

In step S1906, the CPU 201 performs the character recognition processing in the area determined in step S1905. The character recognition processing is similar to the processing in step S1404, and thus redundant description thereof will be omitted.

In step S1907, the CPU 201 determines whether the character string (keyword) indicated by the character information acquired in step S1906 satisfies the condition of the number of characters. If the number of characters of the recognized character string is larger than the condition value ("7" illustrated in FIG. 7), the CPU 201 deletes characters from the end until the condition value is reached. Not only the condition of the number of characters but also the condition of the character type is applicable. For example, the condition may specify whether a number is included or whether an alphabetical character is included. A character string recognized without this condition may be used as a keyword.

In step S1908, the CPU 201 displays the Letter Of Introduction button screen 1800, in which the character string recognized in step S1905 is input to the input field 1801 illustrated in FIG. 18, on the touch panel 410 of the operation unit 205. If the character recognition fails, the user can change the patient number in this screen.

In step S1909, the CPU 201 determines whether the "No" button 1803 of the Letter Of Introduction button screen 1800 is selected by the user. If the CPU 201 determines that the "No" button 1803 is selected (YES in step S1909), the processing returns to step S1901. If the CPU 201 determines that the "Yes" button 1802 is selected (NO in step S1909), the processing proceeds to step S1910.

In step S1910, the CPU 201 determines whether the patient number input by the user when the Letter Of Introduction button screen 1800 is displayed satisfies the conditions of the character type and the number of characters. If the CPU 201 determines that the conditions are satisfied (YES in step S1910), the processing proceeds to step S1911. If the CPU 201 determines that the conditions are not satisfied (NO in step S1910), the processing returns to step S1908.

In step S1911, the CPU 201 sets the folder path as a combination of the host name and the keyword, as a destination. The method of combination is similar to that in the processing in step S1413.

In step S1912, the CPU 201 performs similar processing to the processing in step S1414.

In step S1913, the CPU 201 controls the network I/F, and the network I/F transmits image data to the destination set in step S1911. The CPU 201 may store the set destination in association with a button and, each time the button is selected, transmit image data to the stored destination without performing the character recognition processing.

Performing the above-described processing makes it possible to automatically set the character recognition processing result as a part of a folder path, thus reducing the user's work. Setting conditions, such as the number of characters of a keyword, makes it possible to prevent a misrecognized character string from being used as a destination.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   a scanner that scans an image of a document to generate image data;
   a communicator that receives area information, a folder path, icon image data, character information and a scan setting;
   a controller; and
   a user interface that display a button including an icon image of the received icon image data and one or more characters indicated by the received character information,
   wherein the user interface receives selection of the displayed button, and then the scanner scans, based on the received scan setting, an image of a document to generate image data, and then the controller obtains character information from an area of the image of the generated image data, the area being an area indicated by the received area information, and then the controller performs a process for storing the generated image data in a folder having a folder name including one or more characters indicated by the obtained character information, the folder being included in a folder indicated by the received folder path.

2. The image processing apparatus according to claim 1, wherein the controller performs a character recognition process for obtaining the character information from the area of the image of the generated image data.

3. The image processing apparatus according to claim 1, wherein the user interface displays the button on a home screen.

4. The image processing apparatus according to claim 1, wherein the communicator receives the area information, the folder path, the icon image data, the character information and the scan setting from an information processing apparatus via a network.

5. The image processing apparatus according to claim 1, wherein the received character information is set as a name of the button.

6. The image processing apparatus according to claim 1, wherein the communicator further receives a file name, and wherein the image data stored in the folder has the received file name.

7. The image processing apparatus according to claim 1, wherein the user interface receives selection of the button and then the scanner, in response to the selection of the button, scans the image of the document.

8. The image processing apparatus according to claim 7, wherein the scanner scans the image of the document without an execution instruction by a user after the user interface receives selection of the button.

9. The image processing apparatus according to claim 1, further comprising a printer that prints an image on a sheet.

10. The image processing apparatus according to claim 1, wherein the communicator transmits the generated image data for storing the generated image data in the folder having the folder name by the execution of the process for storing the generated image data in the folder having the folder name.

11. A non-transitory computer-readable storage medium storing a program for causing an image processing apparatus having a scanner to execute a method, the method comprising:

scanning an image of a document to generate image data;

receiving area information, a folder path, icon image data, character information and a scan setting;

displaying a button including an icon image of the received icon image data and one or more characters indicated by the received character information, wherein selection of the displayed button is received, and then the scanner scans, based on the received scan setting, an image of a document to generate image data;

obtaining character information from an area of the image of the generated image data, the area being an area indicated by the received area information; and performing a process for storing the generated image data in a folder having a folder name including one or more characters indicated by the obtained character information, the folder being included in a folder indicated by the received folder path.

12. An image processing method comprising:

scanning an image of a document to generate image data;

receiving area information, a folder path, icon image data, character information and a scan setting;

displaying a button including an icon image of the received icon image data and one or more characters indicated by the received character information, wherein selection of the displayed button is received, and then an image of a document to generate image data are scanned based on the received scan setting;

obtaining character information from an area of the image of the generated image data, the area being an area indicated by the received area information; and performing a process for storing the generated image data in a folder having a folder name including one or more characters indicated by the obtained character information, the folder being included in a folder indicated by the received folder path.

13. The image processing method according to claim 12, wherein the controller performs a character recognition process for obtaining the character information from the area of the image of the generated image data.

14. The image processing method according to claim 12, wherein the button is displayed on a home screen.

15. The image processing method according to claim 12, wherein the area information, the folder path, the icon image data, the character information and the scan setting are received from an information processing apparatus via a network.

16. The image processing method according to claim 12, wherein the received character information is set as a name of the button.

17. The image processing method according to claim 12, wherein the receiving further receives a file name, and wherein the image data stored in the folder has the received file name.

18. The image processing method according to claim 12, wherein selection of the button is received and then the image of the document is scanned in response to the selection of the button.

19. The image processing method according to claim 18, wherein the image of the document is scanned without an execution instruction by a user after selection of the button is received.

20. The image processing method according to claim 12, further comprising printing an image on a sheet.

21. The image processing method according to claim 12, further comprising transmitting the generated image data for storing the generated image data in the folder having the folder name by the execution of the process for storing the generated image data in the folder having the folder name.

* * * * *